United States Patent [19]

Kan et al.

[11] Patent Number: 4,962,389

[45] Date of Patent: Oct. 9, 1990

[54] IMAGE RECORDER USING INK IMPARTED WITH ADHESIVENESS BY ELECTRO-CHEMICAL REACTION

[75] Inventors: Fumitaka Kan, Tokyo; Yasuyuki Tamura; Naoki Kushida, both of Yokohama; Koichi Tohma; Hiroshi Fukumoto, both of Kawasaki; Toshiya Yuasa, Mituka; Noboru Tohyama, Tokyo; Norihiko Koizumi, Yokohama, all of Japan

[73] Assignee: Canon Kabushiki Kaisha, Tokyo, Japan

[21] Appl. No.: 374,045

[22] Filed: Jun. 30, 1989

Related U.S. Application Data

[62] Division of Ser. No. 75,045, Jul. 17, 1987, Pat. No. 4,881,084.

[30] Foreign Application Priority Data

| | | | |
|---|---|---|---|
| Jul. 25, 1986 | [JP] | Japan | 61-175191 |
| Sep. 13, 1986 | [JP] | Japan | 61-216752 |
| Jan. 9, 1987 | [JP] | Japan | 62-001709 |
| Apr. 23, 1987 | [JP] | Japan | 62-098590 |
| May 29, 1987 | [JP] | Japan | 62-131584 |

[51] Int. Cl.[5] .................... G01D 15/16; B41J 2/005; C09D 11/02

[52] U.S. Cl. .................... 346/140 R; 346/76 R; 106/20; 355/280; 400/126

[58] Field of Search .................... 346/76 PH, 1.1, 76 R, 346/140 R; 101/470, 471; 106/20, 208; 250/316.1; 400/126; 355/280, 281

[56] References Cited

U.S. PATENT DOCUMENTS

| | | | |
|---|---|---|---|
| 3,519,463 | 7/1970 | Baum | 101/470 |
| 3,986,874 | 10/1976 | Marsh | 101/471 |
| 4,140,907 | 2/1979 | Oba | 250/316.1 |
| 4,227,200 | 10/1980 | Mansukhani | 346/1.1 |
| 4,462,035 | 7/1984 | Koto | 346/76 PH |
| 4,548,734 | 10/1985 | Chaux | 106/208 |
| 4,549,907 | 10/1985 | Kohn | 106/208 |
| 4,838,940 | 6/1989 | Kan | 106/22 |

*Primary Examiner*—Bruce A. Reynolds
*Assistant Examiner*—Scott Rogers
*Attorney, Agent, or Firm*—Fitzpatrick, Cella, Harper & Scinto

[57] ABSTRACT

A fluid ink which is substantially nonadhesive but can be imparted with an adhesiveness on application of an energy such as electrochemical energy or heat energy, is obtained by impregnating a crosslinked substance such as guar gum or polyvinyl alcohol compound with a liquid dispersion medium such as water. The fluid ink, preferably formed into a layer in advance, is supplied with a pattern of energy to be provided with an adhesive pattern, which is then transferred to a recording medium, such as plain paper, directly or by the medium of an intermediate transfer medium to form an ink pattern corresponding to the energy pattern applied.

28 Claims, 15 Drawing Sheets

□ β-1, 4 BOND, β-D MANNOPYRANOSE RESIDUE

▨ α-1, 6 BOND, α-D GALACTOPYRANOSE RESIDUE

M⊕ =Na, K, 1/2Ca

IMAGE RECORDER USING INK IMPARTED WITH ADHESIVENESS BY ELECTRO-CHEMICAL REACTION

This application is a division of application Ser. No. 075,045 filed July 17, 1987 now U.S. Pat. No. 4,881,084.

FIELD OF THE INVENTION AND RELATED ART

The present invention relates to an image recording method which retains various advantages of the conventional recording systems and yet realizes a low recording cost, and an ink and apparatus specifically adapted thereto.

In recent years, along with the rapid progress of information industries, various data processing systems have been developed, and accordingly various recording methods and recording apparatus have been developed and adopted for the respective data processing systems. Among these, representative recording systems capable of recording on plain paper include electrophotography and laser beam printing system developed therefrom, ink jetting, thermal transfer, and impact printing system using a wire dot printer or daisy-wheel printer.

The impact printing system produces annoying noise and the application thereof to full- or multi-color recording is difficult. The electrophotography and the laser beam printing produce images at a high resolution, but the apparatus therefor are complicated and large in size thus requiring a large apparatus cost. The ink jet printing system requires only a small expendable cost but involves a process defect that, because a thin nozzle is used for jetting a low-viscosity liquid ink therefrom, the nozzle is liable to be clogged with the ink solidified during a period of non-use Further, as the ink for the ink jet system is low-viscosity ink, the ink is liable to spread after it is deposited on paper, thus resulting in blurring of images.

Further, according to the thermal transfer method, wherein a heat pattern was supplied to a solid ink layer formed on a sheet form support to form a fused ink pattern, which is then transferred to plain paper, etc., to form an image thereon. The thermal transfer method has advantages that a relatively small apparatus is used and therefore only a small apparatus cost is required. However, an ink ribbon used in the thermal transfer method is composed by forming a solid ink layer on an expensive support and the ink ribbon is disposed after use, so that the thermal transfer method involves a disadvantage that it requires a high expendable cost.

In order to remove the above disadvantage of the thermal transfer method, Japanese Pat. Publication (JP-B) 59-40627 has proposed a thermal transfer system which unnecessitate the use of an ink ribbon used in the conventional thermal transfer method by coating a roller with a heat-fusible ink. More specifically, JP-B 59-40627 discloses a recording system wherein a roller is coated with a heat-fusible ink showing a plasticity and containing electro-conductive powder, heat generated by current-conduction from a recording electrode is supplied to the ink and the resultant fused ink is transferred to paper. However, the ink used in JP-B 59-40627 is plastic, so that an image formed by conduction-heating in the ink on the roller is liable to be deformed and disturbed. Further, the conductivity is provided by inclusion of a necessarily large amount of conductive powder, so that the color of the ink is constrained by the conductive powder generally colored in black. As a result, it is difficult to constitute and use an ink of a color other than black.

On the other hand, there has also been known the electrolytic recording method, wherein a record paper is subjected to generation of color through oxidation-reduction caused by electric conduction. However, in the electrolytic recording method, a recording paper preliminarily coated with a developer agent is used. As a result, the recorded image is inferior in stability and durability. Furthermore, there is involved a problem of a high running cost.

Further, U.S Pat. No. 4,561,789 discloses a thermal ink transfer printing system wherein a heat-fusible semi-solid ink is selectively supplied with heat to form a melted ink pattern, which is then transferred to a recording medium However, the semisolid ink used in U.S. Pat. No. 4,561,789 is one such as a mixture of carnauba wax and oily dye which has a substantial adhesiveness already at room temperature so that it is transferred to a recording medium without heat application if it contacts the recording medium. Accordingly, in order to effect selective transfer on heat application of the semisolid ink, it is necessary to dispose a filter or like porous material between the ink and the recording medium so as to ensure the non-contact of the ink with the recording medium. The use of such a filter material would inherently results in several disadvantages such as lowering in resolution of the recorded images.

SUMMARY OF THE INVENTION

A principal object of the present invention is to provide an image recording method and an image recording apparatus which has solved the above mentioned problems of the conventional recording systems and realized a recording at a low cost.

Another object of the present invention is to provide a novel ink suitably used in the image recording method.

A more specific object of the present invention is to provide a type of ink which can be used up without disposal as far as it has not been actually used for recording or without using an ink ribbon or ink sheet to be disposed after use as in the conventional thermal transfer system.

A further specific object of the present invention is to provide a fluid ink which is not attached or transferred to an intermediate transfer medium or a recording medium (final transfer medium) when it only contacts such a medium and which can be used without being applied as a thin solid ink layer on a support unlike a solid ink held on a conventional ink ribbon or ink donor film.

As a result of earnest study, we have found an ink which is fluid at room temperature unlike a solid ink used in a conventional thermal transfer recording method and the adhesiveness of which can be controlled patternwise, e.g., electrochemically, by patternwise application of an energy. We have further found it possible to form an ink pattern corresponding to an image signal on a transfer-receiving medium by utilizing the selective or patternwise control of the adhesiveness of the ink surface and while providing almost the same degree of resolution as the thermal transfer process.

The recording method of the present invention is based on the above findings and comprises providing a recording method, comprising: providing a fluid ink which is substantially non-adhesive but can be imparted with an adhesiveness on application of an energy; causing the fluid ink to contact a transfer-receiving medium at an ink contact position; and applying a pattern of the energy corresponding to a given image signal to the fluid ink at or in the neighborhood of the ink contact position to selectively provide the ink with an adhesive pattern, which is then transferred to the transfer-receiving medium to form an ink pattern corresponding to the energy pattern applied.

Further, the image recording ink according to the present invention is a fluid ink adapted for use in the above mentioned image recording method and comprises a liquid dispersion medium, and an image recording ink, comprising: a liquid dispersion medium, and a crosslinked substance impregnated with the liquid dispersion medium; the ink being capable of forming a fluid layer, substantially non-adhesive and capable of being imparted with an adhesiveness on application of an energy. The fluid ink used in the present invention is preferably one having a property that even if it is cut or separated into a plurality of pieces, they can be re-united into a single mass through adhesion with the elapse of time when placed together.

Further, the recording apparatus of the present invention is one especially adapted for practicing the above mentioned recording method, and comprises an ink-holding means having an ink-supply part and holding a fluid ink so that the fluid ink will contact a transfer-receiving medium moved along the ink-supply part at the ink supply part, and an energy application means for applying a pattern of energy corresponding to a given image signal to the fluid ink at or in the neighborhood of the ink supply part to provide the fluid ink with an adhesive pattern; whereby at the ink-supply part, the adhesive pattern of the fluid ink is transferred to the transfer-receiving medium to form thereon an ink pattern corresponding to the energy pattern applied.

In the above described recording system of the present invention, the fluid ink is disposed in direct contact with the transfer-receiving medium and a part of the fluid ink is directly and selectively provided with an adhesiveness to be transferred onto a transfer-receiving medium, thus forming an ink pattern thereon. The pattern energy is preferably applied to the fluid ink when the fluid ink is already in contact with the transfer-receiving medium but can be applied before the contact as far as the resultant adhesive state is sufficiently retained until the subsequent contact. In this connection, the term "in the neighborhood of the ink contact position (or ink-supply part)" refers to a case wherein the fluid ink provided with the pattern energy in the neighborhood of the ink contact position (or ink-supply part) reaches the ink contact position (or ink-supply part) as a result of relative movement of the fluid ink and the transfer-receiving medium while it retains a sufficient adhesiveness required for transfer.

Because of the above features, in the recording system (method and apparatus) of the present invention, an expensive ink ribbon or ink sheet which comprises a solid ink layer formed through complicated steps on an expensive support sheet and yet is to be disposed in the conventional thermal transfer process becomes unnecessary, whereby the expendable cost can be reduced remarkably.

Further, because a fluid ink is used in the present invention, a part of the ink not actually used in the recording operation can be easily recycled for repeated use, so that the recording cost can be decreased also from this point.

These and other objects, features and advantages of the present invention will become more apparent upon a consideration of the following description of the preferred embodiments of the present invention taken in conjunction with the accompanying drawings, wherein like reference numerals denote like parts. In the following description, "%" and "part(s)" representing a quantitative proportion or ratio are by weight unless otherwise noted specifically.

DETAILED DESCRIPTION OF PREFERRED EMBODIMENTS

A fundamental structure of the recording apparatus according to the present invention will be explained with reference to FIG. 1 which is a schematic sectional view taken across the thickness of a transfer-receiving medium showing an embodiment of the recording apparatus.

Figure 1:
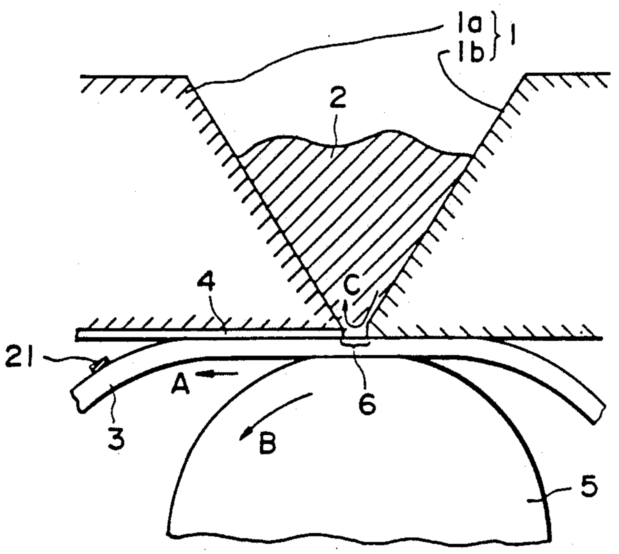
FIGS. 1, 3, 4, 5, 14, 15, 17 and 18 respectively a schematic sectional view of an apparatus for practicing the recording method of the present invention.

Referring to FIG. 1, there is provided an ink-holding member 1 having ink-holding side walls 1*a*and 1*b* and being capable of holding therein a fluid ink 2. Below the ink-holding member 1, i.e., on the side of an ink-supply part thereof through which the fluid ink 2 is selectively flown, there is disposed a transfer-receiving medium or recording medium 3 composed of, e.g., smooth paper and moved in the direction of an arrow A. The recording medium 3 faces the lower end of the side wall member 1*b* at an initial ink contact point and an recording medium 4 disposed beneath the side wall member 1*a* at an ink separation point respectively with the same or different predetermined gaps on the order of 100–200 μm so that the fluid ink 2 does not flow out through the gaps when no energy is applied.

In the embodiment of FIG. 1, the "ink contact position" 6 at which the fluid ink 2 contacts the recording medium 3 is a zone or site with a certain length extending from the above-mentioned initial ink contact point to the ink separation point. On the other hand, the above-mentioned ink supply part refers to an apparatus part corresponding to the ink contact position.

On the bottom face of the ink-holding side wall member 1*a* opposite to the recording medium 3, the recording head 4 is disposed as a means for applying an energy corresponding to a given image signal to the fluid ink 2. Further a roller 5 rotating in the direction of an arrow B is optionally disposed so as to move the recording medium 3 along the ink supply part or the ink contact position.

A fundamental arrangement of the recording apparatus has been described above. Now, a typical embodiment of the recording method according to the present invention will be explained while explaining the operation of the above-mentioned recording apparatus.

Referring again to FIG. 1, the fluid ink 2 in the ink holding member 1 is substantially non-adhesive and can be imparted with an adhesiveness on application of an energy, e.g., electric energy. An example of the fluid ink may be obtained by impregnating a crosslinked substance such as guar gum with a liquid dispersion medium such as water.

The term "adhesiveness" used herein is a selective one and refers to a property of the fluid ink by which a portion of the ink contacting an object such as an intermediate transfer medium is selectively separated or cut from the ink body to adhere to the object. Thus, the "adhesiveness" is not concerned with whether the ink body is glutinous ot not.

The fluid ink 2 contacts the recording medium 3 at the ink contact position 6 along with the movement of the recording medium 3 in the direction of the arrow A. At this time, the ink 2, as it is substantially non-adhesive when supplied with no energy, flows in the direction of an arrow C and is separated from the recording medium 3 at the ink separation point whereby substantially no adhesion or transfer onto the recording medium occurs.

The fluid ink 2 moving in this way is supplied with a pattern of energy corresponding to a given image signal in the neighborhood of the ink separation point while it is in contact with the recording head 4 and is selectively imparted with an adhesiveness, e.g., because of a change in the crosslinked structure through an electro-chemical reaction in the ink. The fluid ink 2 selectively imparted with an adhesiveness, adheres to and is transferred onto the recording medium moving in the arrow A direction to form an ink pattern 21 thereon.

The ink pattern 21 may be developed, if necessary, by a known developing means such as toner particles at a point downstream from the ink contact position.

General features of the recording method of the present invention have been described above. Hereinbelow, the manner of the formation of the ink image (or pixel) 21 at the ink contact position is explained in some detail with reference to FIG. 2 which is an enlarged view of the position in FIG. 1.

Figure 2:
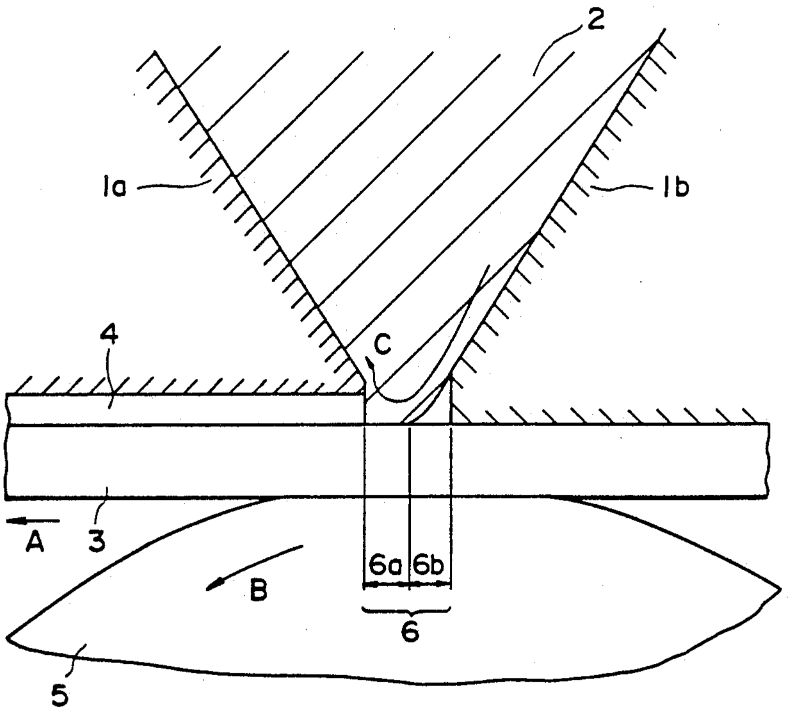
FIG. 2 is an enlarged view of the ink contact position shown in FIG. 1.

Referring to FIG. 2, at the gap 6 of, e.g., a slit form, constituting the ink supply part corresponding to the ink contact position, the fluid ink 2 contacts the recording medium 3 only at a downstream part 6*a* and not at an upperstream part 6*b* shown in FIG. 2 as the recording medium 3 moves in the arrow A direction.

Along with the movement of the recording medium 3 in the arrow A direction, the ink 2 flows as indicated by the arrow C due to friction between the recording medium 3 and the ink 2.

In a case where a complete slippage between the recording medium 3 and the ink 2 is intended, a minute amount of the ink 2 can be attached or transferred to the recording medium 3 through shearing at concavities on the recording medium 3 because the recording medium 3 does not always have a completely smooth surface. Further, in the neighborhood of the recording head 4, it is possible that a portion of the ink 2 microscopically does not move as indicated by the arrow C. In this case, the ink 2 can slip into spacing between the recording medium 3 and the recording head 4, and a minute amount of the ink 2 can attach to the recording medium 3.

In order to prevent such ink transfer on no energy application, it is preferred to dispose a driving means such as a roller or gear wheel in the ink 2 for promoting the movement in the direction of the arrow C, or to incorporate a magnetic material in the ink 2 and rotate a magnetic roller, etc., disposed in the ink. Further, a portion of the ink 2 transferred through shearing on no energy application to the recording medium 3 is not fully fixed to the recording medium 3, so that it is possible to remove the transferred ink portion by an appropriate means such as an adhesive roller which is caused to contact the recording medium 3 downstream from the ink contact position.

When a pattern of energy corresponding to an image signal is applied to the ink 2 from the recording head 4, a prescribed amount of the ink 2 corresponding to the signal energy is provided with an adhesiveness or lowered in viscosity to be transferred accompanied with sticking or penetration, thus resulting in an ink pattern 21. After the formation of the ink pattern 21, fixing may be effected as desired on the recording medium 3 downstream from the ink contact position by conventional fixing means such as heated rollers or pressure rollers.

The remainder of the fluid ink 2 not transferred onto the recording medium 3 at the above-mentioned ink transfer or contact position is further moved in the arrow C direction and is separated from the recording medium 3 because of its non-adhesiveness to be returned into the ink-holding member 1 and reused because of its fluidity.

Hereinabove, the recording apparatus and the recording method of the present invention have been explained based on a typical embodiment thereof, but it is not always required that the ink contact position is a zone having a certain length extending from an initial ink contact point to an ink separation position.

The size of the ink contact position along the direction of movement of the recording medium 3 may preferably be on the order of 0.3–30 mm, particularly about 1–10 mm while it depends on the viscosity of the fluid ink 2, etc. When the ink contact position is longer than about 10 mm, it is preferred to dispose a stirring means for promoting the flow of the ink 2.

The spacing from the recording medium 3 to the bottom of the ink-holding side wall member 1*b* (or the recording head 4) at the initial ink contact point (or the ink separation point) may preferably be about 0–500 μm, further preferably about 100–200 μm.

The position of the recording head 4 is not particularly restricted but may be any position at which the fluid ink 2 at or in the neighborhood of the ink contact position can be selectively imparted with an adhesive. More specifically, the position of the energy application from the recording head 4 may preferably be at or in the neighborhood of the ink separation point in view of the easiness of control of the selective adhesion or separation of the ink 2, but can be at or in the neighborhood of the initial ink contact position or an intermediate position between the initial ink contact position and the ink separation position.

The kind of energy applied from the recording head or energy application means can be heat energy instead of electric energy, while it will be described in more detail hereinafter.

In case of using heat energy, contact or non-contact heating means as used in the conventional thermal transfer process as a heat source may be used without particular restriction, inclusive of a thermal head, a current conduction heating, radiation beam such as laser beam and infrared rays, or induction heating.

As described with reference to FIG. 1, however, it is preferred to use electric energy, and further to utilize an electro-chemical change of the ink 2 in respect of energy efficiency.

Figure 3:
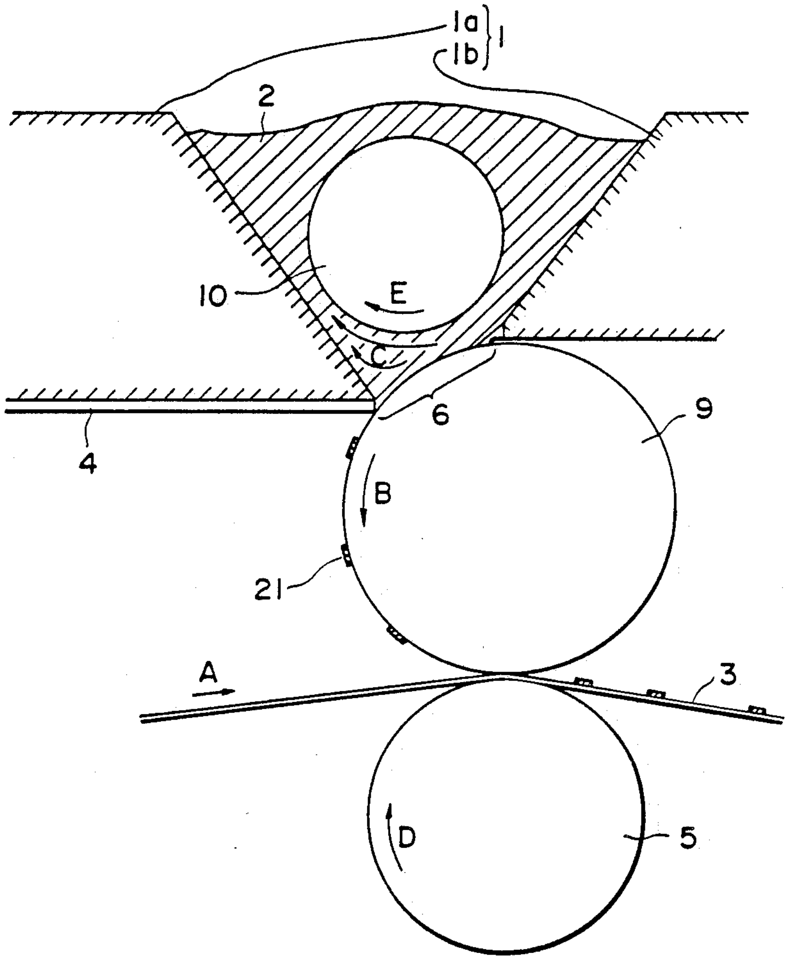

In the above embodiment described with reference to FIG. 1, the adhesive pattern of the fluid ink 2 is directly transferred to the recording medium 3 of a sheet form. Alternatively, it is possible that the adhesive pattern is once transferred to an intermediate transfer medium 9 as shown in FIG. 3 to form an ink image 21 thereon, which is then transferred to a recording medium 3 of plain paper, etc. This embodiment is preferred because the recording medium may be selected from a wide scope of materials.

Such an intermediate transfer medium can be composed of a metal or plastic film moving in one direction or formed in an endless belt, but may preferably be in the form of a cylindrical roller 9 as shown in FIG. 3 in order to accurately control the ink transfer conditions by adjusting the moving speed at the ink contact position and to facilitate a pressure transfer at an ink transfer position at which the ink image is transferred from the intermediate transfer medium to the recording medium. In this case, it is possible to also use the intermediate transfer roller to constitute a part of the side wall or bottom of the ink holding member as shown in FIG. 3, and the recording medium 3 may be plain paper.

Referring again to FIG. 1 or 2, the platen roller 5 may be either an elastic roller having a surface of various rubbers, resins, etc. or a rigid roller having a surface of metal, ceramics, etc., but may preferably be an elastic roller so as to provide a certain nip width in view of better contact between the ink 2 and the recording medium 3. Incidentally, in order to promote the separation of the ink 2 not supplied with energy from the recording medium 3, it is also preferred to provide a separation promotion means, e.g., a stirring roller 10 as shown in FIG. 3 for promoting the flow of the ink 2 in the arrow C direction.

Figure 4:
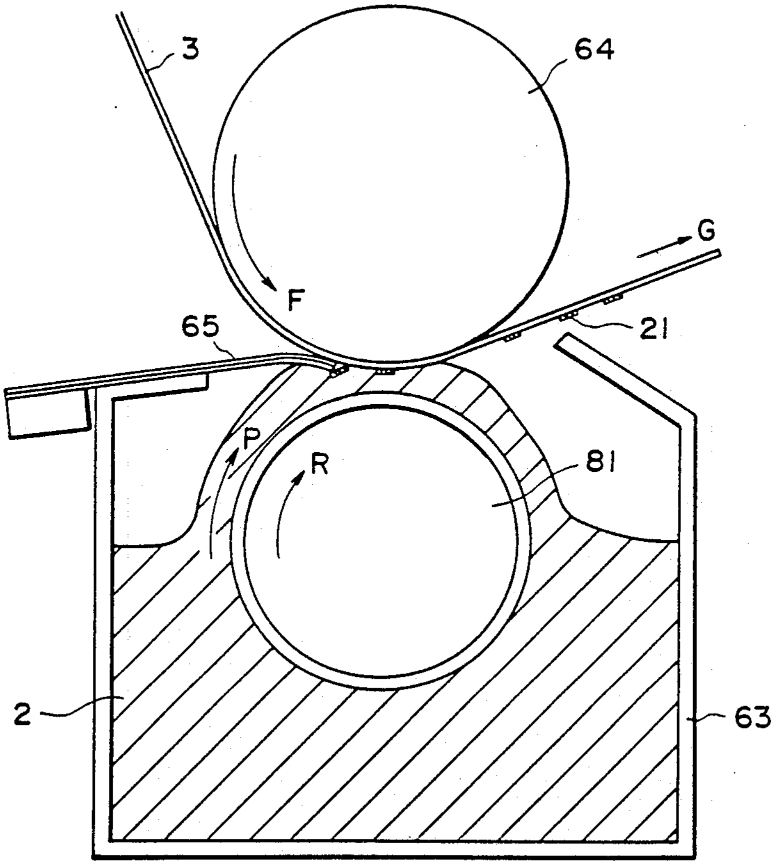

FIG. 4 shows another embodiment of the recording method of the present invention, wherein the fluid ink 2 and the recording medium 3 are disposed in a positional relationship reverse to that shown in FIG. 1.

Referring to FIG. 4, an ink-carrying roller 81 having a surface of stainless steel, etc., within an ink container 63 for holding therein a fluid ink 2 so that it rotates in the direction of an arrow R while carrying the ink 2.

Above the ink-carrying roller 81 at the ink contact position, a platen roller 64 as a transfer means having a surface of, e.g., silicon rubber is disposed opposite to the roller 81 with a certain gap therefrom so as to rotate in the direction of an arrow F. The platen roller 64 is disposed so that a transfer roller 3 contacting the roller 64 at the ink contact position is moved in the direction of an arrow G while also contacting a layer of the fluid ink 2 formed on the ink-carrying roller 64. The recording medium 3 may be composed of a plastic film, smooth paper having a Bekk smoothness of 300 sec or above and coated so as not to be penetrable with the liquid dispersion medium in the ink 2, or a metal sheet, etc.

Above the ink-carrying roller 81 at a position upstream from the ink contact position where the ink-carrying roller 81 and the platen roller 64 are disposed opposite to each other, a recording electrode ON recording head 65 as a means for applying an energy corresponding to a given signal is disposed with a certain spacing from the surface of the roller 81. The tip of the electrode 65 provided with an electrode element is disposed so that it can contact the layer of the fluid ink 2 formed on the ink-carrying roller 81.

Thus, the fluid ink 2 is carried on the ink-carrying roller 81 and conveyed in an arrow P direction along with the rotation in the arrow R direction of the roller 81.

The fluid ink 2 moved in this way is supplied with a pattern of voltage from the recording electrode 65 at an energy application position where the ink 2 contacts the electrode 65. A current corresponding to the voltage flows between the recording electrode 65 and the ink-carrying roller 81 through the fluid ink 2, whereby the fluid ink 2 is selectively imparted with an adhesiveness, e.g., because of a change in crosslinking structure through an electro-chemical reaction in the ink 2.

A portion of the fluid ink 2 selectively imparted with an adhesiveness is further moved in the arrow P direction to reach the ink contact position where the recording medium 3 on the platen roller 64 contacts the ink 2, and the adhesive portion of the ink 2 is transferred onto the recording medium 3 moving in the arrow G direction to form an ink pattern 21 thereon.

The ink pattern 21 may be developed, as desired, by a known developing means such as toner particles disposed above the recording medium 3 downstream of the ink contact position.

The remainder of the fluid ink 2 not transferred to the recording medium 3 at the ink contact position is further conveyed in the arrow P direction to be separated from the recording medium 3 because of its non-adhesiveness and the action of a gravity, etc., and recycled to the ink container 63 for reuse.

While a representative embodiment of the image recording apparatus or method according to the present invention has been described above, the ink-carrying member can be in the form of a belt or a sheet (inclusive of film) instead of a cylindrical roller as described above. It is preferred that such a belt- or sheet-form ink carrying member is disposed in an endless form so as to be capable of being used repeatedly in view of the cost of the material.

In the embodiment shown in FIG. 4, the current corresponding to image signal has been flown along the path of recording electrode 65→ink 2→ink-carrying roller 81 but can be flown along the path of recording electrode 65→ink 2→recording medium 3 (or further to platen roller 64) when the recording medium is composed of an electro-conductive medium such as a metal sheet. Further, as will be described hereinafter, the recording electrode may have an ink-contacting tip comprising a plurality of electrode elements between which a current can be flown through the ink 2.

Further, it is possible to dispose the recording electrode 65 on the side of the recording medium 3 contacting the ink 2 at a position almost the same as the ink contact position.

The kind of energy applied to the layer of the ink 2 may be heat energy instead of the electric energy as described above. In the case of heat energy, the recording head can also be disposed on the side of the recording medium 3 opposite to the side contacting the ink 2.

In case of using heat energy, contact or noncontact heating means as used in the conventional thermal transfer process as a heat source may be used without particular restriction, inclusive of a thermal head, a current conduction heating, radiation beam such as laser beam and infrared rays, or induction heating.

As described with reference to FIG. 4, however, it is preferred to use electric energy, and further to utilize an electro-chemical change of the ink 2 in respect of energy efficiency.

In the above embodiment described with reference to FIG. 4, the adhesive pattern of the fluid ink 2 is directly transferred to the recording medium 3 of a sheet form. In order to obtain an ink image finally on an ordinary recording medium such as plain paper, it is preferred as shown in FIG. 5 that the adhesive ink pattern is once transferred to an intermediate transfer medium to form thereon an ink pattern thereon, which is then transferred onto a recording medium such as plain paper.

Figure 5:
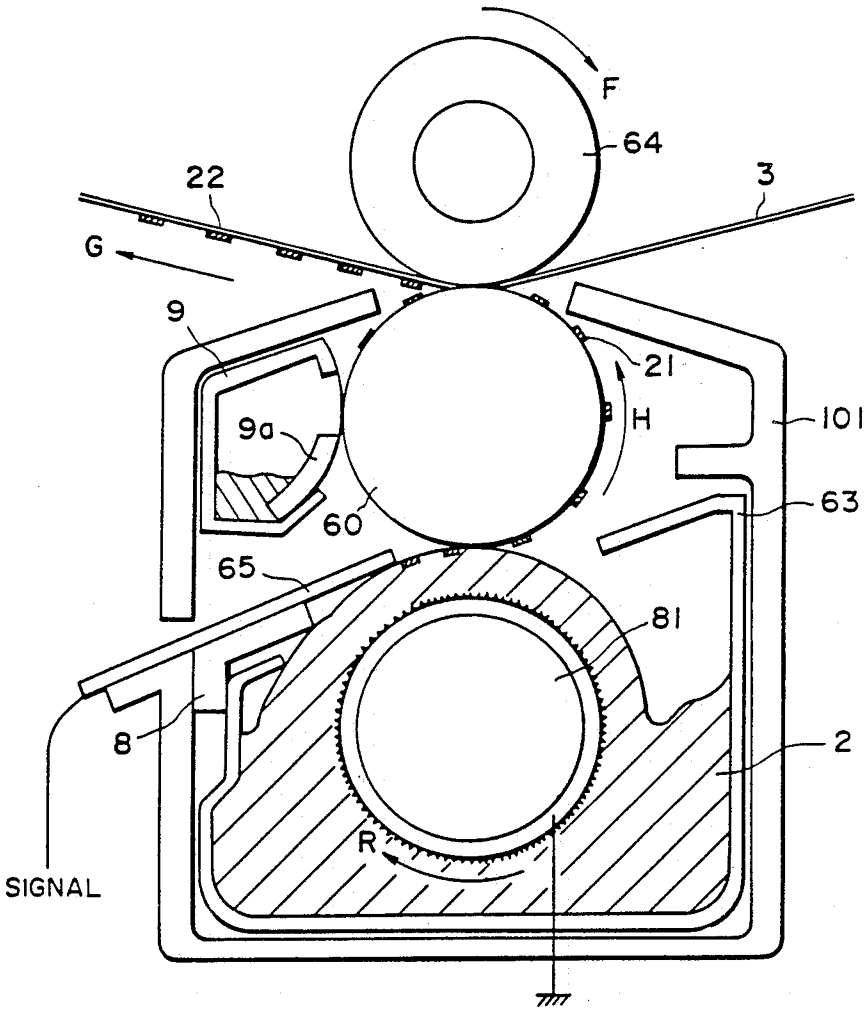

Referring to FIG. 5, at the ink contact position in this embodiment, an ink-carrying roller 81 is disposed below and with a certain gap from an intermediate transfer roller 60 which is composed of a cylinder of iron coated with a hard chromium plating and rotates in the direction of an arrow H. The intermediate transfer roller 60 is disposed so that the surface thereof may contact a layer of the fluid ink 2 formed on the carrying roller 81.

On the other hand, at an ink pattern transfer position located at the opposite position of the intermediate transfer roller 60 with respect to the ink contact position, a recording medium 3 of, e.g., plain paper is disposed in contact with the surface of transfer roller 60 and is conveyed in an arrow G direction. Further, so as to movably sandwich the recording medium 3 with the intermediate transfer roller 60, a platen roller 60 having a surface of silicone rubber, etc., and rotating in an arrow F direction is disposed opposite to the transfer roller 60.

Further upstream from the energy application position where the recording head 65 faces the ink-carrying roller 81, a blade 8 as an ink layer thickness-regulation means for regulating the thickness of a layer of the ink 2 on the roller 81 may be disposed, as desired, opposite to and with a certain gap from the ink-carrying roller 81.

Further, a cleaning means 9 having a blade 9*a* of, e.g., urethane rubber, may be disposed, as desired, above and so as to be capable of contacting the intermediate roller 60 at a position downstream from the above-mentioned ink image-transfer position where the intermediate transfer roller 60 and the platen roller 64 are disposed opposite to each other.

Among the above described members, the ink-carrying roller 81, ink container 63, intermediate transfer roller 60, recording electrode 65, blade 8 and cleaning means 9 are housed in an outer casing 101.

In the embodiment shown in FIG. 5, as in the embodiment of FIG. 4, an ink pattern 21 formed on the intermediate transfer roller 60 is transferred onto the recording medium 3 at the ink image-transfer position to form a transfer-recorded image 22 thereon.

In the embodiment of FIG. 5, the recording medium 3 does not directly contact the layer of the fluid ink 2 per se on the ink-carrying member 81, so that the flexibility in constitution of the recording medium 3 or the fluid ink 2 is increased. From this point, the embodiment of FIG. 5 is a preferred one.

Next, a somewhat detailed explanation is made on the fluid ink 2 suitably used in the above-mentioned recording system.

The fluid ink 2 used in the present invention may be one having fluidity and yet being substantially non-adhesive. More specifically, an ink satisfying the following properties may preferably be used.

(1) Fluidity

When measured by means of a rotational viscometer, e.g., Vismetron Model VS-A1, mfd. by Shibaura System K.K. with a stainless steel rotor of about 3 mm in diameter at normal temperature (25° C.), the fluid ink should preferably show a viscosity 10,000–2,000,000 cps, particularly 100,000–1,000,000 cps at a rotor speed of 0.3 rpm; and above 5,000 cps, particularly 10,000–400,000 cps at a rotor speed of 1.5 rpm.

(2) Non-adhesiveness (or liquid dispersion medium-retaining ability)

On the surface of a sample fluid ink held in a container, an aluminum foil of 5 cm×5 cm in size is, after being accurately weighed, placed gently and is left standing as it is for 1 min. in an environment of a temperature of 25° C. and a moisture of 60° C. Then, the aluminum foil is gently peeled off from the surface of the fluid ink and then quickly weighed accurately to measure the increase in weight of the aluminum foil. Through the measurement, the fluid ink used in the present invention should preferably show substantially no transfer of its solid content (e.g., crosslinked substance) and a weight increase of the aluminum foil of less than 1000 mg, particularly on the order of 1–100 mg. In the above measurement, it is possible to separate the aluminum foil from the fluid ink body, if necessary, with the aid of a spatula.

If the non-adhesiveness of the fluid ink is insufficient in the light of the above standard, not only the liquid component but also the solid component of the fluid ink can transfer to a transfer-receiving medium to a practically non-negligible extent even under no energy application, thus resulting in a lower image quality.

On the other hand, if the fluidity of the fluid ink is lower than the above range, the supply of the ink becomes difficult.

Preferred examples of the fluid ink having such fluidity and non-adhesiveness include an ink in the form of a gel, in a broad sense, comprising a crosslinked substance impregnated with and holding therewith a liquid dispersion medium, and an ink in the form of a sludge obtained by dispersing particles having a particle size of preferably 0.1–100 μm, further preferably 1–20 μm, in a liquid dispersion medium of a relatively high viscosity preferably having a viscosity of 5000 cps or above as measured at a rotor speed of 1.5 rpm according to the above-mentioned method for measuring the fluidity. An ink satisfying the properties of both the gel ink and the sludge ink is further preferably used.

With respect to the gel ink of these fluid inks, it is presumed that the gel ink is substantially non-adhesive or not substantially transferred to a transfer-receiving medium because the liquid dispersion medium except for a minor portion thereof is well retained in the crosslinked substance.

With respect to the latter sludge ink, it is presumed that the ink is not substantially transferred to a transfer-receiving medium because the particles are hightly aligned on the ink interface so that the contact of the dispersion medium to the transfer-receiving medium is suppressed.

It is also presumed that when the gel ink or the sludge ink is supplied with a pattern of an energy, such as that of heat energy, the crosslinked structure or the alignment state of the particles is changed thereby, so that the fluid ink is imparted with an adhesiveness in a pattern corresponding to the energy pattern.

In the recording method of the present invention, is most cases, nearly 100% of the ink portion provided with adhesiveness is transferred to a recording medium 31 or intermediate transfer medium) or a final transfer medium (i.e., a recording medium in the case where an intermediate transfer medium is used). In a case where such a high transfer rate is not attained, it is preferred that the above-mentioned change in crosslinked structure, etc., is a reversible one so as to facilitate the reuse of the non-transferred portion of the ink.

The fluid ink 2 may suitably be an ink (a gel ink in a borad sense as described above) comprising a crosslinked substance impregnated with a liquid dispersion medium.

Herein, the "crosslinked substance" refers to a single substance which per se can assume a crosslinked structure, such as those generally known as a thickness or a gelling agent, or a mixture of a substance capable of assuming a crosslinked structure with the aid of an additive such as a crosslinking agent for providing a crosslinking ion such as borate ion, and the additive. Further, the term "crosslinked structure" refers to a three-dimensional structure having a crosslinkage or crosslinking bond. The crosslinkage may be composed of any one or more of covalent bond, ionic bond, hydrogen bond and van der Waal's bond, but may preferably be composed of ionic bond and/or hydrogen bond in order to satisfy the above-mentioned fluidity and liquid dispersion medium-retaining property of the ink in combination.

In the ink of the present invention, the crosslinked structure is only required to be such that a desired degree of liquid dispersion medium-retaining property is given thereby. More specifically, the crosslinked structure may be any one of a network, a honeycomb, a helix, etc., or may be an irregular one.

The liquid dispersion medium in the ink of the present invention may be any inorganic or organic liquid medium which is preferably liquid at room temperature. The liquid medium should preferably have a relatively low volatility, e.g., one equal to or even lower than that of water.

A preferred example of the liquid dispersion medium is an aqueous or a hydrophilic dispersion medium inclusive of water, a water-miscible solvent, and a mixture of water and a water-miscible solvent. Preferred examples of the water-miscible solvent include alcohols, particularly diols.

In case where such an aqueous or hydrophilic dispersion medium is used as the liquid dispersion medium, the crosslinked substance may preferably be composed of or from a natural or synthetic hydrophilic high polymer or macromolecular substance.

Examples of such a hydrophilic high polymer include: plant polymers, such as guar gum, locust bean gum, gum arabic, tragacanth, carrageenah, pectin, mannan, and starch; microorganism polymers, such as xanthane gum, dextrin, succinoglucan, and curdran; animal polymers, such as gelatin, casein, albumin, and collagen, cellulose polymers such as methyl cellulose, ethyl cellulose, and hydroxyethyl cellulose; starch polymers, such as soluble starch, carboxymethyl starch, methyl starch; alginic acid polymers, such as propylene glycol alginate, and alginic acid salts; other semi-synthetic polymers, such as derivatives of polysaccharides; vinyl polymers, such as polyvinyl alcohol, polyvinylpyrrolidone, polyvinyl methyl ether, carboxyvinyl polymer, and polysodium acrylate; and other synthetic polymers, such as polyethylene glycol, and ethylene oxide-propylene oxide block copolymer. These polymers may be used singly or in mixture of two or more species, as desired.

The hydrophilic polymer may preferably be used in a proportion of 0.5–20 parts, particularly 1–5 parts, with respect to 100 parts of the liquid dispersion medium.

On the other hand, when oil such as mineral oil or an organic solvent such as toluene is used as the liquid dispersion medium, the crosslinked substance may be composed of or from one or a mixture of two or more compounds selected from metallic soaps inclusive of metal stearates, such as aluminum stearate, magnesium stearate, and zinc stearate, and similar metal salts of other fatty acids, such as palmitic acid, myristic acid, and lauric acid; or organic substances such as hydroxypropyl cellulose derivative, dibenzylidene-D-sorbitol, sucrose fatty acid esters, and dextrin fatty acid esters.

Further, it is possible in some cases that a fluid ink having desired characteristic is obtained from plastisol or organosol obtained by mixing vinyl chloride resin powder and a liquid plasticizer, through appropriate adjustment of the mixing ratio, the average particle size or particle size distribution or addition of a stabilizer or other additives.

When the hydrophilic polymer or metallic soap, etc., is used, the fluidity and liquid dispersant-retaining ability of the resultant fluid ink vary to some extent depending on the formulation of these components or combination thereof with a liquid dispersion medium. It is somewhat difficult to determine the formulation or composition of these components in a single way. Accordingly, it is preferred to formulate a composition of a liquid dispersion medium and a crosslinked substance so that the resultant fluid ink will satisfy the fluidity and non-adhesiveness (liquid dispersion medium-retaining property) as defined above.

It is possible to control these properties by changing the pH of the fluid ink, e.g., by adding an base such as NaOH, KOH or $Na_2CO_3$, or an acid such as hydrochloric acid or acetic acid.

It is further possible to add a salt such as NaCl, LiCl or KCl in order to adjust the conductivity of the ink at the time of energy application.

In respects of easily obtaining the above-mentioned fluidity and liquid dispersion medium-retaining property and further easy control of crosslinked structure on energy application, hydrophylic polysaccarides inclusive of carrageenan, locust bean gum, xanthane gum, guar gum, etc., and their derivatives are preferred. Further, in many cases, a mixture system is preferred. Examples of such mixture systems include a mixture of carrageenan and locust bean gum, a mixture of xanthane gum and locust bean gum; and further a mixture of a galactomannan such as guar gum (or modified guar gum) or locust bean gum, or a polymer having hydroxy groups such as polyvinyl alcohols with a crosslinking agent such as a boric acid source compound capable of providing borate ions.

Figure 6A:
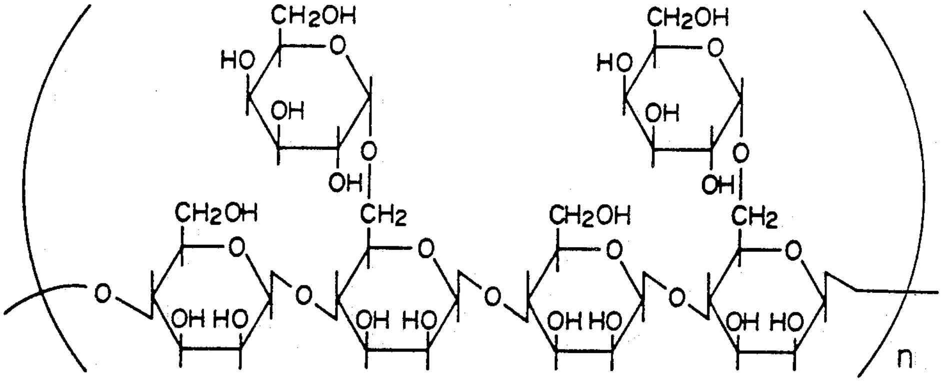
FIGS. 6A and 6B represent structural formulas of guar gum and a borate ion, respectively.

Herein, "guar gum" is a polysaccaride, obtained from the seeds of guar plant, consisting mainly of mannose and galactose and having a partial structure as shown in FIG. 6A. For example, it is preferred to use a boric acid source compound such as sodium borate ($Na_2B_4O_7.10H_2O$) in a proportion of 1-20 parts per 100 parts of the guar gum.

Figure 7A:
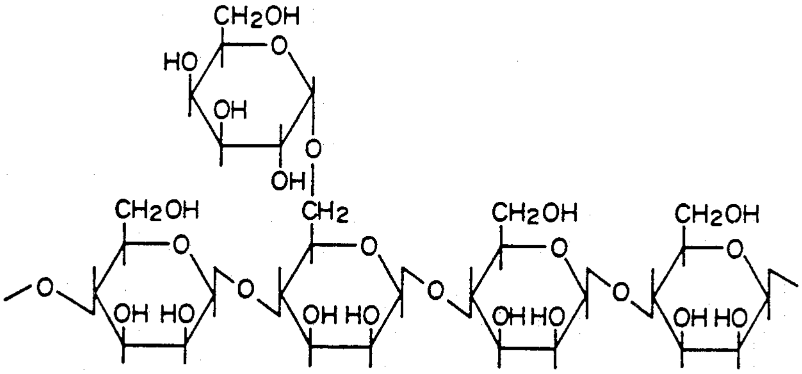
FIGS. 7A and 7B represent a partial structural formula and an explanatory view illustrating a block polymer structure, respectively, of locust bean gum.
Figure 7B:
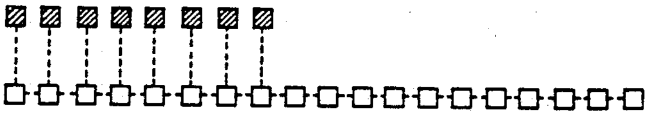

Further, "locust bean gum" is a polysaccaride, obtained from a perennial Ceratonia siliqua L. (carob tree), consisting mainly of mannose and galactose and having a partial structure as shown in FIG. 7A. The locust bean gum has a kind of block structure as shown in FIG. 7B.

Figure 8:
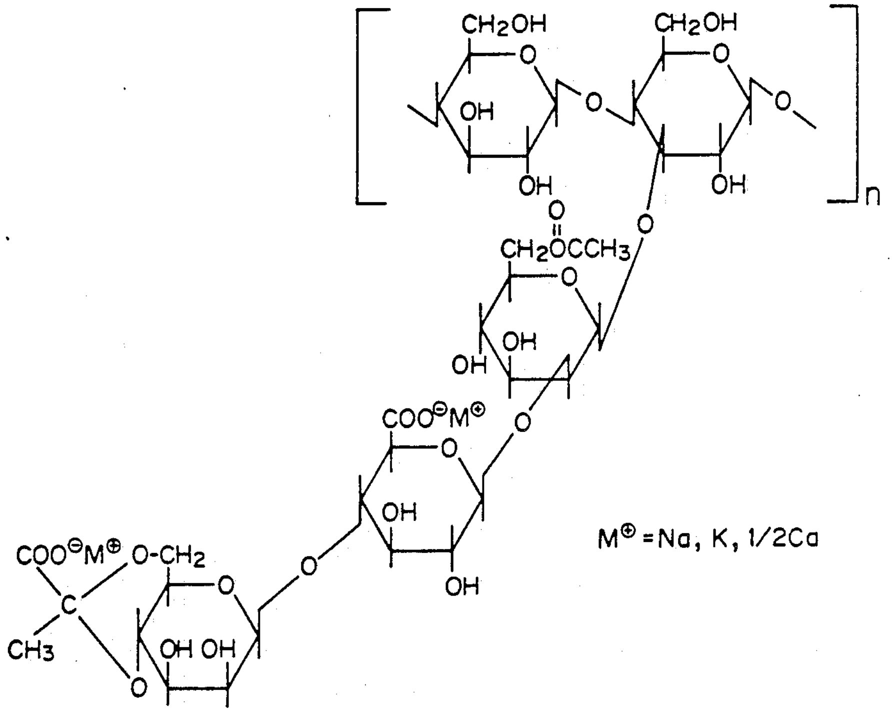
FIG. 8 represents a partial structural formula of xanthane gum.

Further "xanthane gum" is a polysaccaride, obtained from a secretion of xanthomonas bacteria, having a partial structure as shown in FIG. 8. It is preferred that the xanthane gum is used in a proportion of 50-200 parts per 100 parts of the locust bean gum.

Further, "polyvinyl alcohol (or "polyvinyl alcohol compounds" used herein include substantially completely saponified products represented by the formula:

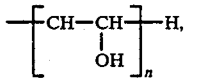

partially saponified product represented by the formula (inclusive of random form):

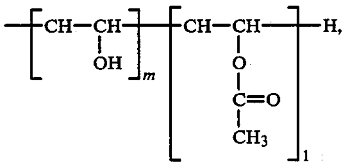

and polymers having the above structures as a skeleton including acetallization products of the above. The polyvinyl alcohols may preferably have a saponification degree (m/(m+1)×100) of 70 mol % or above and an average polymerization degree (n or m+1) of about 300-3000.

The fluid ink used in the present invention preferably comprises a liquid dispersion medium and a crosslinked substance, as described above, and may further comprise, as desired, a colorant inclusive of dye, pigment and colored fine particles, a color forming compound capable of generating a color on energy application, an electrolyte providing an electro-conductivity or conduction-heat generating capability to the ink, or another additive such as an antifungal agent or an antiseptic.

The coloring agent may be any of dyes and pigments generally used in the filed of printing and recording, such as carbon black. Among these, a dye or pigment, particularly a pigment, having a relatively low affinity to the liquid dispersion medium is preferably used in order to suppress the coloring of the transfer-receiving medium, i.e., the intermediate transfer medium or the recording medium, due to the transfer thereto of the liquid dispersion medium under no energy application. The pigment or dye may preferably be used in a proportion of 1-70 parts, particularly 5-50 parts, per 100 parts of the liquid dispersion medium.

Further, the colorant may be in the form of fine colored particles, like a toner of various colors for electrophotography, obtained by dispersing a pigment or dye as described above in a natural or synthetic resin and forming the dispersion into fine particles. A fluid ink containing such colored particles behaves like a dilatant liquid and is particularly preferred in respect of suppressing the transfer of the liquid dispersion medium to or coloring of the transfer-receiving medium under no energy application.

The colored fine particles may preferably be used in a proportion of 1 part or more, further preferably 5-100 parts, particularly preferably 20-80 parts, per 100 parts of the liquid dispersion medium. Generally speaking, it is preferred that colored particles having a large size are incorporated in a higher proportion in order to provide a better coloring characteristic.

The colorant inclusive of the pigment or the colored fine particles may preferably have a particle size of 0.1-100 μm, particularly 1-20 μm.

In the particle size is below 0.1 μm, the colorant particles are not retained in the crosslinked structure but are transferred together with the liquid dispersion medium even when the ink contacts the intermediate transfer medium or the recording medium under no energy application, whereby an image fog is liable to result. On the other hand, if the particle size exceeds 100 μm, a resolution required for an ordinary image is not satisfied.

On the other hand, it is possible to use a color forming compound similarly as a dye or pigment as described above. The color forming compound may be those generally known as heat-sensitive color former or pressure sensitive color former, i.e., those capable of forming color under the action of an acid or heat, and a fluid ink containing such a coloring forming agent can be selectively to color development on application of an energy pattern.

In view of the stability against a solvent or liquid dispersion medium, however, the colorant used in the present invention may preferably be pigment or dye or colored particles as described above.

The fluid ink may be obtained from the above components, for example, by uniformly mixing a liquid dispersion medium such as water, a crosslinked substance, and also an optional additive such as a crosslinking agent, a colorant, an electrolyte, etc., under heating as desired, to form a viscous solution or dispersion, which is then cooled to gel the same.

Incidentally, when colored particles such as toner particles are used as a colorant, it is preferred that a crosslinked substance and a liquid dispersion medium are first mixed under heating to form a uniform liquid, and then the colored particles are added thereto. In this case, it is further preferred that the addition of the particles is effected in the neighborhood of room temperature so as to avoid the agglomeration of the particles.

When the fluid ink is formed in this way as a mixture of carrageenan and locust bean gum, or a mixture of xanthane gum and locust bean gum, the fluid ink, on application of heat energy, is at least partially subjected to a change in or destruction of the crosslinked structure to be reversibly converted into a sol state, whereby it is selectively imparted with an adhesiveness corresponding to the energy application pattern.

On the other hand, when the fluid ink is formed from guar gum crosslinked with, e.g., borate ions, the fluid ink, on application of electric energy in a pattern, is reversibly imparted with an adhesive pattern similarly as in the above case. It has not been clarified why the guan gum is imparted with a selective adhesiveness. According to our experiments, however, it has been observed that the amount of energy required for imparting the adhesiveness in this case is remarkably smaller than the above case where heat energy is used, the provision of the adhesiveness is caused in the neighborhood of the anode, and the adhesiveness change is a reversible one. Accordingly, it is assumed that the crosslinked structure is at least partly changed or destroyed due to an electrochemical reaction. More specifically, according to our knowledge, it is assumed that the adhesiveness change is caused by a reversible change in combination state of borate ion and guar gum because of transfer of electrons through the recording electrode.

Further, when the fluid ink is constituted as a magnetic ink, powder of a magnetic material is added thereto. The magnetic material may be any material which is generally known as a ferromagnetic material inclusive of ferromagnetic metal elements such as iron, cobalt, nickel, and manganese; alloys consisting mainly of these elements; oxides of these elements such as magnetite, hematite, and ferrite, and other compounds including these elements. These magnetic material can also constitute all or a part of the colorant to be used in the ink.

It is further possible to add into the fluid ink an anti-oxidant, a surfactant for stabilizing the dispersion of particles, and a wetting agent for preventing drying of the ink in addition to the electrolyte as described above.

The fluid ink 2 constituted in the above manner is not ordinarily transferred through adhesion to a recording medium when not supplied with energy but becomes transferable when supplied with, e.g., heat energy. The critical or boundary temperature may preferably be set to a temperature of 60°-200° C., particularly 80°-150° C. In a case where a gelling agent is used, a three-dimensional solid structure retaining a liquid medium is destroyed to become transferable to a recording medium. In other cases, it is considered that the provision of transferability is caused by a decrease in viscosity due to heating.

In the above, the nature and composition of the fluid ink suitably used in the recording system has been explained in some detail. Further to say, in the embodiment shown in FIG. 4, the fluid ink 2 is required to have a fluid layer-forming property. Herein, "fluid layer forming property" refers to a property of the fluid ink that it flows under application of a certain external force to form a layer or film thereof, e.g., on an ink-carrying member. It is preferred that the thus formed ink film or layer can be transferred by an external force.

As will be described in detail, however, whether or not the layer of a fluid ink is, even if it has a fluid layer forming property, actually transferred in a layer as shown in FIG. 4, can also depend on the surface property of an ink-carrying member, and other conditions. For example, in a case where an intermediate transfer medium 60 is used, the reason why the fluid ink in a yet non-adhesive state is conveyed only by ink-carrying member 81 and not by the intermediate transfer medium 60, i.e., why the fluid ink in a yet non-adhesive state is not transferred in a layer to the intermediate transfer medium 60, depends on the difference in surface property of the carrying member 81 and the intermediate transfer medium 60 and other factors such as a difference in rotational speed between the carrying member 81 and the intermediate transfer medium 60.

Examples of the fluid ink of the present invention described above generally have a fluid layer-forming property. Among those, in view of long-term storage stability and stability of performances during a continuous use, a particularly preferred class of fluid ink is constituted as an ink comprising a polyvinyl alcohol compound having a saponification degree of 70 mol % or above and a viscosity of 80 cps or below as measured at 20° C. in a 4% aqueous solution by means of Hoepler viscometer (according to JIS K6726-1977) as a crosslinked substance as described above in a proportion of 2-60 wt. % of the ink.

If the saponification degree is below 70 mol %, the polyvinyl alcohol compound is caused to have poor affinity to or solubility in water and becomes unsuitable for used in an aqueous ink as a fluid ink of the present invention. The saponification degree described herein refers to a value measured according to JIS K6726 (measurement of saponification degree of polyvinyl alcohol).

The viscosity of the 4% aqueous solution generally relates to a property relating to the polymerization degree of the polyvinyl alcohol compound, and greatly affects the gel properties of an ink containing the polyvinyl alcohol compound as a crosslinked substance. More specifically, if the viscosity exceeds 80 cps, the ink is generally caused to have a poor fluidity is liable to cause a dull change in adhesiveness or energy application, and is further caused to have too high a viscosity when imparted with an adhesiveness on energy application, whereby it fails to provide good properties for ink transfer operation, thus resulting in inferior quality of recorded images.

More specifically, the polyvinyl alcohol compound preferably used as a crosslinked substance is one having a saponification degree of 70-99.9 mol %, particularly 75-99.5 mol %, and a 4%-aqueous solution viscosity of 80 cps or below, particularly 60 cps or below.

The polyvinyl alcohol compound may be used in a proportion of 2-60 wt. %, preferably 3-40 wt. % with respect to the total weight of the ink including the polyvinyl alcohol compound per se.

If the proportion (content) is below 2%, the resultant ink fails to assume a crosslinked structure providing a sufficient degree of non-adhesiveness. On the other hand, if the proportion exceeds 60%, the resultant ink fails to have a sufficient fluidity.

As briefly mentioned hereinbefore, the "polyvinyl alcohol compounds" referred to herein include the substantially completely saponified product and partially saponified products as described hereinbefore with reference to the general formulas, and polymers having such skeletons. Further, as far as the above mentioned requirement with respect to the saponification degree and the 4%-aqueous solution viscosity are satisfied, the polyvinyl alcohol compounds may suitably be modified products having a cationic or anionic functional group, acetallization products with formaldehyde, etc., and other classes of modified products inclusive of polymers such as ethylenevinyl alcohol copolymers.

When the polyvinyl alcohol compound is used as a crosslinked substance, water alone may be used as a preferable liquid dispersion medium. However, for preventing drying or retaining wetness of the ink and other purposes, a water-miscible organic solvent or a mixture of water and a water-miscible organic solvent can also be used preferably.

Examples of such water-miscible organic solvents include: alkyl alcohols having 1–4 carbon atoms, such as methyl alcohol, ethyl alcohol, n-propyl alcohol, isopropyl alcohol, n-butyl alcohol, sec-butyl alcohol, tert-butyl alcohol, and isobutyl alcohol; amides, such as dimethylformamide and diethylformamide; ketones or ketoalcohols, such as acetone and diacetone alcohol; ethers, such as tetrahydrofuran, and dioxane; nitrogen-containing heterocyclic ketones, such as N-methyl-2-pyrrolidone, and 1,3-dimethyl-2-imidazolidinone; polyalkylene glycols, such as polyethylene glycol and polypropylene glycol; alkylene glycols having 2–6 carbon atoms, such as ethylene glycol, propylene glycol, butylene glycol, triethylene glycol, 1,2,6-hexanetriol, thiodiglycol, hexylene glycol, and diethylene glycol; glycerine; lower alkyl ethers of polyhydric alcohols, such as ethylene glycol methyl ether, diethylene glycol methyl (or ethyl) ether, and triethylene glycol mono-methyl (or -ethyl) ether, and amines, such as triethanolamine.

The polyvinyl alcohol compound used in the present invention can form a crosslinked structure by itself based on its polymer characteristic, but can be used in combination with a crosslinking agent (or gelling agent) for more positively crosslinking the polyvinyl alcohol compound in order to improve the ink characteristics when supplied with or not supplied with energy A preferred class of the crosslinking agent may be ionic crosslinking agents, including: various salts such as $CuSO_4$; boric acid source compounds capable of generating borate ions in water, such as borax and boric acid. When such an ionic crosslinking agent is used, it becomes easy to selectively provide the ink with an adhesive through an electrochemical reaction involving transfer of electrons or a pH charge. As a result, the use of such an ionic crosslinking agent is preferred in order to suppress the consumption of pattern energy. The ionic crosslinking agent may preferably be used in a proportion of 0.01–30 parts, particularly 0.05–20 parts, per 100 parts of the polyvinyl alcohol compound.

Instead, a crosslink agent utilizing a crosslinking bond such as glyoxal or dialdehydebenzene, or a crosslinking agent utilizing a hydrogen bond such as polyhydric alcohols can also be used in combination with the polyvinyl alcohol compound.

The fluid ink containing 2–60 wt. % of the polyvinyl alcohol compound as described above has many advantageous features, such as susceptibility of reuse, and good stability both during storage and in continuous use. Further, the adhesiveness thereof can be controlled stably and at a good sensitivity by application of energy.

Now, the respective parts shown in the figures will be explained more structurally. Referring again to FIG. 1, the ink-holding member 1 comprising the ink-holding side walls 1*a* and 1*b* is a member for holding the fluid ink in a desired state. The lower ends of the side walls 1*a* and 1*b* defines a slit 6 constituting an ink supply part. The size of the slit 6 along the direction of the movement of the recording medium 3 is not particularly limited but may generally be about 0.3–30 mm, preferably about 1–10 mm. It is preferred that the ink-holding side walls 1*a* and 1*b* are composed of a rigid material such as metal or ceramics.

As has been mentioned above, the energy application means for supplying an energy corresponding to an image signal to a fluid ink 2 in the neighborhood of the ink contact position can be an ordinary thermal head, but may preferably be a recording head as will be described hereinbelow in respect of energy efficiency.

More specifically, when a crosslinked substance comprising guar gum crosslinked with borate ions, the amount of current required for breaking at least a part of the crosslinked structure is only such an amount as required for causing transfer of electrons from crosslinking borate ions which are generally used in a considerably small amount, e.g., on the order of several hundred ppm of the ink.

The above amount of current is almost 1/10 of the amount of current required by a thermal head, so that a low energy consumption recording may be effected by using such an electrochemical change. Further, such an electrochemical reaction is selectively caused in the neighborhood of a recording electrode, so that the recording electrode system is preferred also in respect of improved selective transferability of the ink 2.

Figure 9:
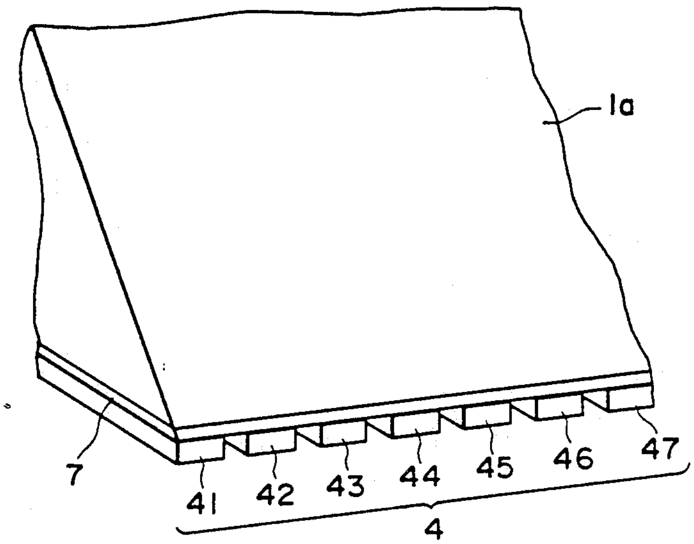
FIGS. 9–11 are respectively an enlarged partial schematic view of a recording head used in an embodiment of the apparatus according to the present invention.

The recording head 4 may preferably take a form of recording electrode as shown in FIG. 9, an enlarged partial perspective view of the lower end portion of the ink-holding side wall 1*a*. More specifically, the recording electrode comprises an insulating plate 7 disposed on the bottom of the side wall 1*a*, and electrode elements 4 (41, 42, 43, . . . ). The recording electrode may for example be formed by forming a copper foil of 10–50 μm in thickness onto a substrate constituting the insulating plate 7, etching the foil to form electrode elements 4, and coating the electrode elements 4 except for the tip portion thereof with an insulating film (not shown) of polyimide, Dry Film (trade name) or another polymer coating material of 20–200 μm in thickness. When the electrodes are used to cause an electrochemical change of the ink 2, the electrode tips may preferably be coated with gold or platinum plating or composed of gold or platinum.

When such a recording electrode is used, the ink 2 may be composed of an aqueous system which is susceptible of conduction as it is or may be formed as a conductive ink containing an electrolyte or electro-conductive fine particles, through which a current is passed for heating or causing an electrochemical reaction.

A recording head 4 as shown in FIG. 9 may be used in such a manner that a current is passed from a plurality of electrode elements (41, 42, 43, . . . ) through the fluid ink 2 to return electrodes (not shown but disposed, e.g., on the bottom of the other ink-holding side wall 1*b*), or in such a manner that a current is passed between the plurality of electrode elements through the ink 2.

Figure 10:
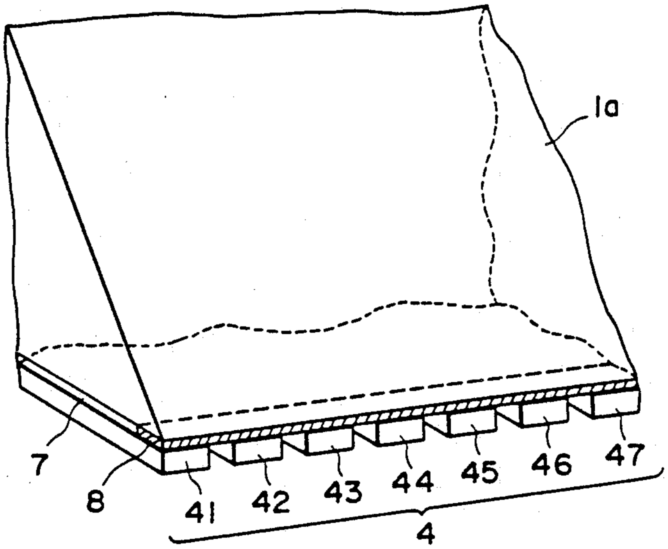

FIG. 10 is an enlarged partial perspective view of another embodiment of the recording head 4 similar to FIG. 9. Referring to FIG. 10, the recording head 4 comprises an insulating plate 7 attached to the bottom of the side wall 1*a* except for the front end thereof, electrode elements disposed beneath the insulating plate 4, and a heat generating element 8 disposed electrically connected with the electrode elements. The heat generating element is subjected to local heat generation corresponding to a given image signal, thereby to heat the ink 2.

A recording head as shown in FIG. 9 or FIG. 10 is preferred because the control of selective adhesion or separation of the fluid ink 2 is easily effected by using a plurality of apertures or gaps formed between the electrode elements 41, 42, 43, . . .

The recording medium 3 as a transfer-receiving medium shown in FIG. 1, FIG. 4, etc., can be a smooth coated paper having a Bekk's smoothness of 300 sec or above through which a liquid dispersion medium does not readily penetrate but may preferably be a film of a plastic material such as polyester, or a metal such as aluminum because it has a good surface characteristic and allows easy selection of materials constituting the fluid ink 2.

Referring now to FIG. 4, the ink-carrying roller 81 is a cylindrical member rotating in the arrow R direction. The cylindrical ink-carrying surface of the roller 81 may be composed of any material, as far as it is possible to form a desired layer of the fluid ink 2 when it is rotated in the arrow R direction. More specifically, the roller surface may be composed of a conductive material such as metal including stainless steel or an insulating material such as various resins.

The surface composed of such a material of the ink-carrying roller 81 can be smooth but may preferably be a roughened one to an appropriate extent (e.g., a roughness of the order of 1S) so as to enhance the conveying and carrying characteristics.

The thickness of the layer of the fluid ink 2 formed on the ink-carrying roller 81 can vary depending on various factors including the fluidity or viscosity of the fluid ink 2, the surface material and roughness thereof of the ink-carrying roller 81, and the rotational speed of the roller 81, but may preferably be generally 0.5–30 mm, further preferably about 1–10 mm, particularly preferably about 2–5 mm as measured at the ink transfer position.

If the layer thickness of the ink 2 is below 0.5 mm, it is difficult to form a uniform ink layer on the ink carrying roller. On the other hand, if the ink layer thickness exceeds 30 mm, it becomes difficult to convey the ink 2 while keeping a uniform peripheral speed of the surface portion on the side contacting the transfer-receiving medium 3, and further it becomes difficult to pass a current from the recording electrode 65 to the ink-carrying roller 81.

In order to more easily regulate the layer thickness of the fluid ink 2, it is possible as desired to dispose an ink layer thickness-regulation means such as a blade 8 as shown in FIG. 5.

The transfer-receiving medium facing the ink-carrying roller 81 at the ink transfer position may be a sheet-form recording medium 3 conveyed in one direction as shown in FIG. 4, or may be an endless intermediate transfer medium 60 as shown in FIG. 5. In order to finally obtain a recorded image on plain paper, it is preferred to use an intermediate transfer medium 60.

On the other hand, the intermediate transfer medium can be composed of a metal or plastic film as described above moving in one direction or can be constituted in the form of an endless belt, but may preferably be in the form of an intermediate roller 60 as shown in FIG. 5 in order to accurately control the ink transfer conditions by adjusting the conveying speed at the ink transfer position and to facilitate pressure transfer at the ink transfer position.

The peripheral surface of the intermediate transfer roller may be composed of a similar material as that constituting the surface of the ink-carrying roller 81 but may preferably be provided with an improved smoothness, anti-staining characteristic, or cleaning facility, e.g., by plating of chromium, etc. In order to improve the selective transfer of the ink 2 at the ink transfer position, it is preferred that the surface of the intermediate transfer roller 60 has a higher smoothness than that of the ink-carrying roller.

It is preferred that a certain shear stress is applied to the layer of the ink 2 sandwiched between the intermediate transfer roller and the ink-carrying roller 81 at the ink transfer position. For this reason, it is preferred that the peripheral speed of the intermediate transfer roller 60 is made equal to or smaller than, particularly about 50–95% of, the superficial peripheral speed of the ink layer on the ink-carrying roller 81.

On the other hand, if the peripheral speed of the intermediate transfer roller 60 is larger than the superficial peripheral speed of the ink layer on the ink-carrying roller, an undesirable phenomenon of the whole ink layer being transferred to the intermediate transfer roller under no energy application is liable to occur.

Further, when the surfaces of the intermediate ink roller 60 and the ink-carrying roller 81 are composed of similar materials and have almost the same smoothness, it is preferred to apply a certain shear stress as described above to the layer of the ink 2 at the ink transfer position. The utilization of such a shear stress closely relates to rheological characteristics of the ink, such as thixotropy, pseudoplasticity, and dilatancy, and is preferred in order to improve the selective transfer characteristic of the ink 2.

In case of using an intermediate transfer medium 60 as shown in FIG. 5, the fluid ink-conveying force exerted by the ink-carrying member 81 is larger than that exerted by the intermediate transfer medium 60 in view of control of selective transferability of the fluid ink at the time of re-starting after a long term of intermission. More specifically, by setting the ink-conveying force of the ink-carrying member larger than that of the intermediate transfer medium, it is possible to effectively suppress non-selective or whole layer transfer of the fluid ink layer at the ink transfer position.

As a result, by using an image forming apparatus arranged in this way, the selective transfer characteristic of the fluid ink is well retained even at the time of start-up of the apparatus, so that a preliminary operation for preventing non-selective transfer at the ink transfer position become unnecessary to substantially remove, a waiting time, whereby a low running cost recording utilizing the characteristics of the fluid ink becomes possible.

It is preferred that a more specific relation with respect to the ink-conveying force as explained below is satisfied. Thus, a torque value a (kg.cm) is obtained by charging a fluid ink 2 in an apparatus as shown in FIG. 5 including an ink-carrying roller 81 disposed in an ink container 63 and an ink layer thickness regulation means 8 disposed spaced apart from the ink-carrying roller 81 with a gap of about 2 mm therebetween, rotating the ink carrying roller 81 connected to an ordinary torque gage under the same conditions as in Example 3 which will be described hereinafter, and measuring the torque exerted on the ink-carrying roller. Further, a torque value b (kg.cm) is obtained by repeating the above operation except that an intermediate transfer roller 60 is used instead of the ink-carrying roller 81. In the present invention, the torques a and b may preferably satisfy a relationship of $a>b$, preferably $(a-b) \geqq 0.01$ kg.cm, particularly preferably $(a-b) \geqq 0.1$ kg.cm. It is sufficient that the above relationship with respect to the ink-conveying force is satisfied at the ink transfer position where the ink-carrying roller 81 and the intermediate transfer roller 60 face each other.

The method of realizing the relationship with respect to the ink-conveying force is not particularly limited but may preferably be accomplished by roughening of the ink-carrying member, provision of low-surface energy condition to the intermediate transfer medium or utilization of magnetic force as will be described hereinbelow. It is preferable to use two or more of these methods in combination in order to make sure of controlling the ink-conveying forces.

(1) Rougnening of the surface of the ink-carrying member

In this case, it is preferred to roughen the surface so as to provide a 10 point-average roughness $R_Z$ (an average of roughnesses measured at 10 points along the periphery of the ink-carrying member; according to JIS B0601-1982) of 1–1000 μm, further preferably 10–500 μm. On the other hand, it is preferred to provide a 10 point-average roughness $R_Z$ as defined above of less than 1 μm, particularly 0.5 μm or less to the intermediate transfer roller 60 when the surface is composed of a metal.

(2) Provision of low-surface energy condition to the surface of the intermediate transfer medium.

In this case, the surface of the intermediate transfer roller 60 may be constituted by silicone resin, fluorine-containing resin, polyethylene type resin, etc., e.g., by coating the surface of the roller 60 with such a resin.

In this instance, the surface energy of the ink-carrying member and the surface energy of the intermediate transfer medium can be suitably composed by measuring the contact angles of the liquid dispersion medium or vehicle (e.g., water) of a sample fluid ink with respect to these surfaces.

More specifically, when an aqueous fluid ink is used, a contact angle $\theta$, between water and the surface of the ink-carrying roller 81 on the side including the water when a water droplet is formed on the surface, and the corresponding contact angle $\theta_4$ when a water droplet is formed on the surface of the intermediate transfer roller 60, may preferably satisfy the relationship of $\theta_4>\theta_1$, particularly $\theta_4-\theta_1 \geqq 10°$.

(3) Utilization of magnetic force

Figure 20:
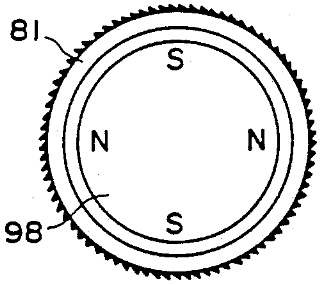
FIG. 20 is a view showing another structure of an ink carrying roller 81.

This is, for example, accomplished by incorporating magnetic particles in the fluid ink 2 and disposing a cylindrical magnet 98 of permanent magent or electromagnet within an ink-carrying roller 81 as shown in FIG. 20. In this case, it is preferred that the magnetic field intensity at the surface of the ink carrying roller is on the order of 200–2000 gauss at the ink transfer position.

Now, the mechanism of image formation will be explained in connection with the rheology of the fluid ink with reference to FIG. 21.

Figure 21:
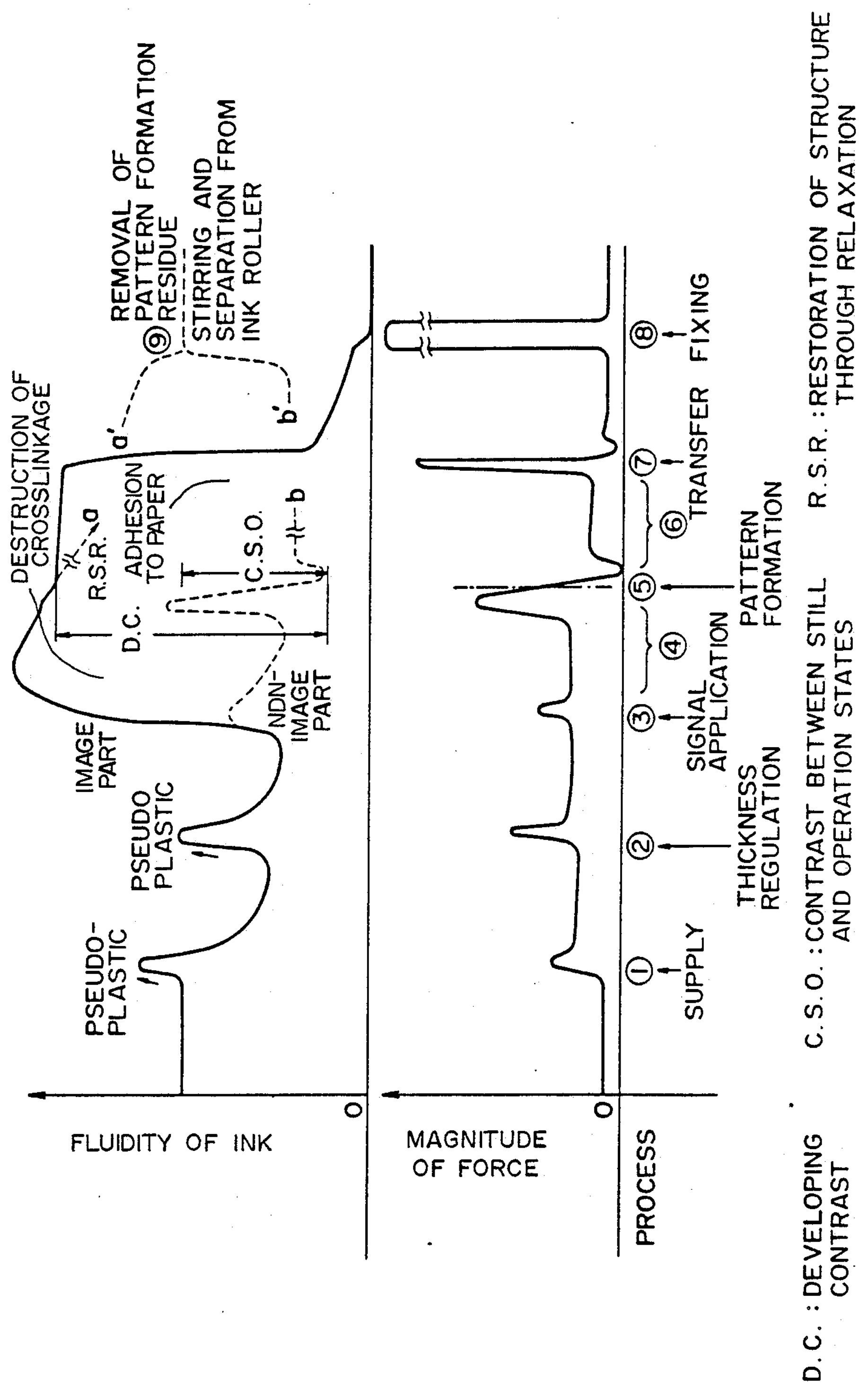
FIG. 21 is a time chart showing the unit steps used in the method of the present invention and changes in fluidity of and magnitude of force applied to the fluid ink in the respective steps.

FIG. 21 is a process chart showing various forces exerted on the fluid ink and the resulting fluidity of the ink in the respective steps involved in the image forming process.

Referring to FIG. 21, in the image forming process using the image forming apparatus according to the present invention, the forces exerted on the fluid ink 2 are generally a shear force, a centrifugal force, and a pressing force.

More specifically, in a supply step ① wherein the fluid ink 2 is supplied to the ink-carrying roller 81, a layer-thickness regulation step ② wherein the thickness of the ink layer 2 on the ink-carrying roller is regulated by the blade 8, and a signal application step ③ wherein a energy corresponding to a given image signal is applied to the ink layer 2 on the ink carrying member 81 from the energy application means 65, the fluidity of the fluid ink 2 may preferably be increased mainly due to pseudoplasticity or thixotropy based on application of a shear force, whereby the ink is supplied and regulated in thickness plastically.

On the other hand, the fluid ink layer 2 may preferably be in a sparingly fluid state capable of retaining the shape during intermediate stages between the steps ① and ②, between the steps ② and ③, and further particularly during a stage ④ after the energy application step ③ up to a step ⑤ of forming an ink pattern 21. More specifically, in these intermediate stages, it is preferred that the fluid ink 2 does not have a plasticity but causes an elastic deformation or restoration. In the image forming process, a force exerted on the ink by the energy application means, etc., only for a short time, the ink is considered to behave as an elastic material against such a stress for a short time.

In an ink pattern formation step ⑤ wherein the fluid ink 2 is selectively transferred to the intermediate transfer roller 60 to form an ink pattern 21, a rather complicated shear force is exerted on the ink layer. A maximum shear force is applied somewhat before the midst of the nip between the ink-carrying roller 81 and the intermediate transfer roller 60 (i.e., toward the energy application means 65), and a somewhat negative shear force is applied at the point of separation between the intermediate transfer roller 60 and the ink layer. For this reason, it is preferred to make the peripheral speed of the intermediate transfer roller 60 smaller than (or equal to) the peripheral speed of the ink-carrying roller 81 so as to apply a shear force based on the difference in peripheral speed, in respect of stabilization of separation of the ink layer and the intermediate transfer roller 60.

In this case, the fluidity of the ink various depending on the operation or intermission of the image forming apparatus as indicated as "contrast between still and operation states" in FIG. 21, and the difference in fluidity can presumably cause non-selective transfer of the ink onto the intermediate transfer roller at the time of start-up the apparatus.

In the present invention, as described hereinbefore, the above-mentioned problem of non-selective transfer of the ink has been solved by making larger the ink-conveying force of the ink-carrying roller 81 than that of the intermediate transfer roller 60 at the ink transfer position.

Incidentally, in a case where a transfer rate of 100% is not attained with respect to the transfer of the ink pattern 21 from the intermediate transfer roller 60 to the recording medium 3 such as plain paper, it is preferred to dispose a cleaning means having a blade 9*a* as shown in FIG. 5 to remove residual ink on the intermediate transfer roller 60.

Further, when a transferred pattern 22 formed on the recording medium 3 is not sufficiently fixed on the recording medium 3, it is possible to dispose a known fixing means by way of heating, pressing, etc., (not shown) at a point downstream from the ink transfer position along the recording medium 3.

Figure 11:
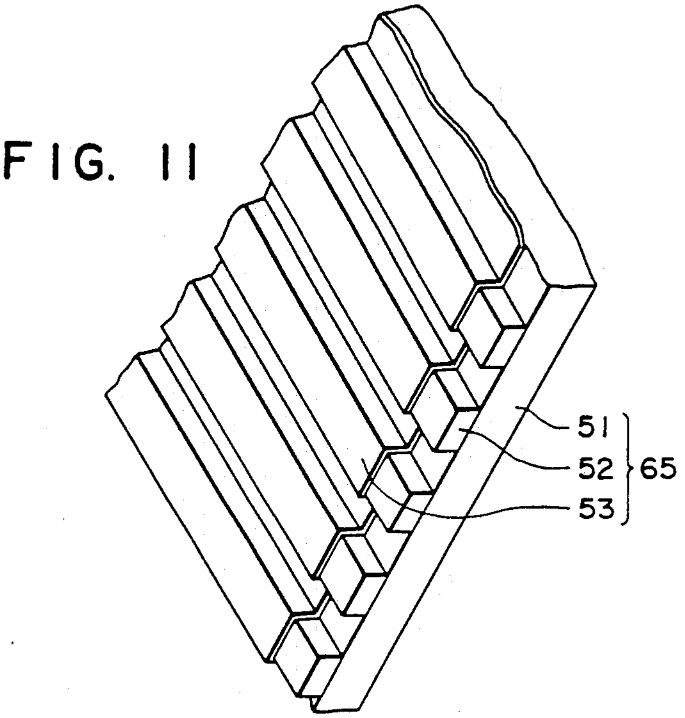

FIG. 11 shows another embodiment of a recording electrode 65 as a preferred example of energy application means for applying energy corresponding to an image signal. With reference to FIG. 11 which is an enlarged partial perspective view, the recording electrode 65 may be obtained by forming a plurality of electrode elements 52 of a metal such as Cu on a substrate 51, and coating the electrode elements 52 except for the tip portions thereof contacting the ink with an insulating film 53 of polyimide, etc. The exposed tip portions of the electrode elements 52 may preferably be coated with a plating of Au, Pt, etc. In view of the durability, a Pt plating is preferred.

Figure 12:
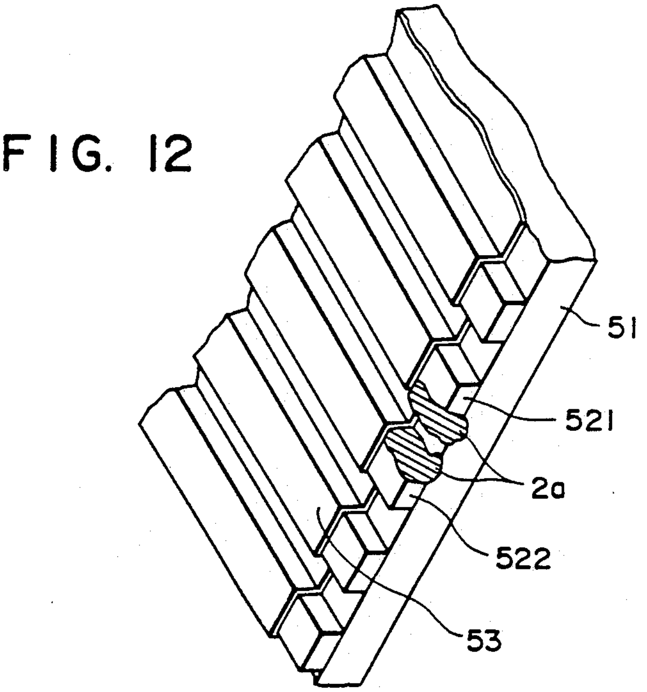
FIG. 12 is an explanatory view for illustrating the operation of the recording head shown in FIG. 11.

In an embodiment already explained with reference to FIGS. 4 and 5, a current is passed between the recording electrode 65 and the ink-carrying roller 81, but it is also possible that a current is passed between an adjacent pair (521 and 522) of the plurality of electrode elements on the recording electrode 65 as shown in FIG. 12.

Figure 13A:
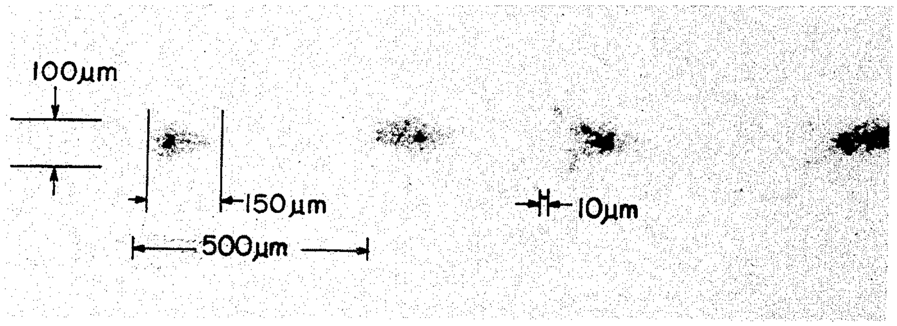
FIGS. 13A is a photomechanical reproduction of an image sample obtained by Example 1.
Figure 13B:
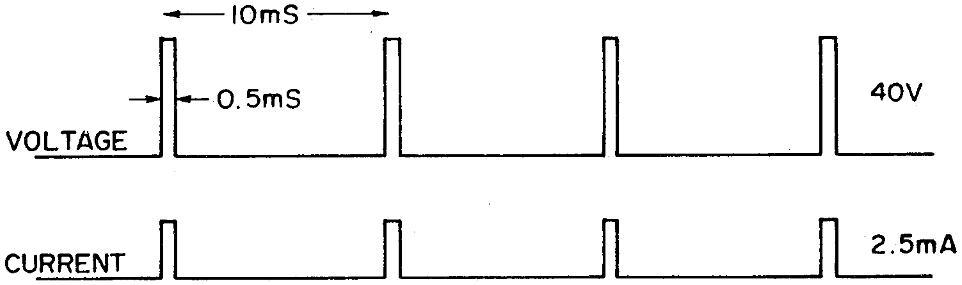
FIG. 13B represents an example of voltage pulse and current pulse used in Example 1.

In this case, when a pulse with a sufficiently short duration as shown in FIG. 13B is applied between the electrode elements, the ink 2 is selectively provided with an adhesiveness, e.g., through breakage of the crosslinked structure, only in the neighborhood of the electrode elements 521 and 522, e.g., as denoted by 2*a* in FIG. 12 illustrating a case where two polarity pulses have been applied.

The pulse signals applied to the recording electrode may be DC pulses or AC (or two polarity) pulses. In a case where a current is passed to provide heat energy, it is preferred that the recording electrode 65 is supplied with AC pulses having a cycle which is sufficiently shorter than the pulse application time in order to suppress an electrochemical reaction.

In the above mentioned case of using an ink 2 containing guar gum crosslinked with borate ions, it is preferred that the recording electrode 65 is used at least partly as an anode. If the crosslinking ion is not an anion like borate ion but a cation, the recording electrode may preferably be used as a cathode.

Figure 14:
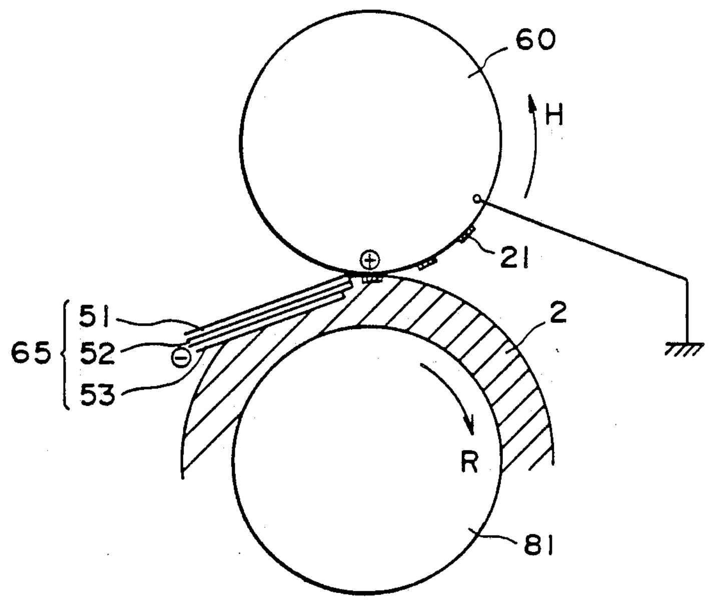

Further, in the present invention, it is also possible to pass a current between a recording electrode 65 and an intermediate transfer roller 60 as shown in FIG. 14. In this case, for example, the recording electrode is used as a cathode and the intermediate transfer roller 60 is used as an anode, where the crosslinked structure of the ink 2 is broken in the neighborhood of the surface of the intermediate transfer roller 60 to form an adhesive portion of the ink 2, which is then transferred onto the roller 60. This embodiment shown in FIG. 14 is preferred in order to prevent tailing of images because a low-viscosity ink is not stagnant in the neighborhood of the recording electrode 65 which does not move.

An embodiment wherein a current is passed from a recording electrode through a fluid ink 2 to a transfer-receiving medium will now be explained with reference to FIGS. 15–18.

Figure 15:
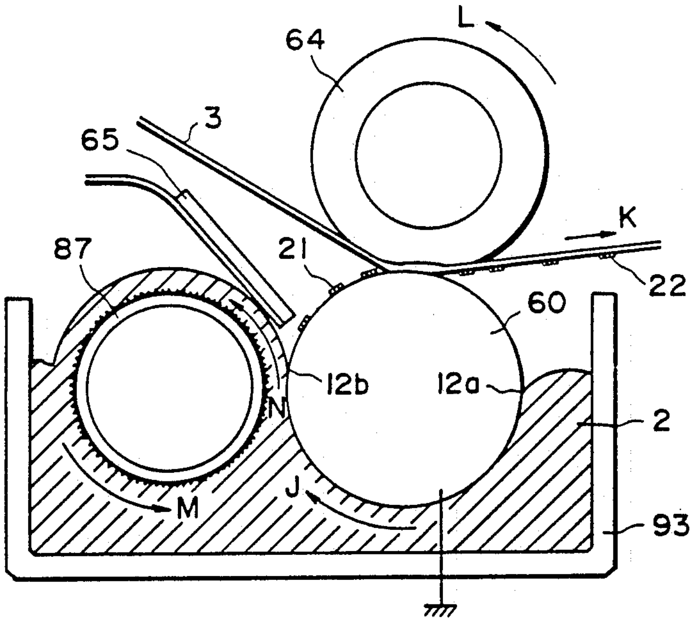

Referring to FIG. 15, an intermediate transfer roller 60 having a surface composed of stainless steel as a transfer-receiving medium is disposed in an ink container 93 as an ink-holding member for storing a fluid ink 2, so that it is rotated in the direction of an arrow J.

In the embodiment shown in FIG. 15, the "ink contact position" at which the fluid ink 2 contacts the intermediate transfer roller 60 is a zone with a certain length spanning from an initial ink contact point 12*a* to an ink separation point 12*b*. On the other hand, the "ink supply part" refers to an apparatus part corresponding to the ink contact position.

At the ink separation point 12*b*, a recording head 65 as a means for applying an energy corresponding to an image signal to the fluid ink 2 is disposed with a certain gap from the intermediate transfer roller 60.

At an ink transfer position downstream from the ink separation point, a recording medium 3 of, e.g., plain paper, disposed in contact with the surface (ink image forming surface) of the intermediate transfer roller 60 so as to be moved in the direction of an arrow K. Further, a platen roller 64, as a transfer means, comprising a surface of, e.g., silicone rubber and rotating in the direction of an arrow L is disposed so as to sandwich the recording medium 3 in combination with the intermediate transfer roller 60.

Further, an ink-stirring roller 87 is disposed as desired so as face the intermediate transfer roller 60 with a certain gap at the ink separation point, as an auxiliary means for selectively conveying the fluid ink to the intermediate transfer roller 60 and for stirring the ink 2. The ink stirring roller 87 comprises a cylindrical roller with a surface roughed, e.g., by sandblasting, rotating in the direction of an arrow M. The ink-stirring roller 87 also has a function of promoting the separation of the fluid ink 2 from the intermediate transfer roller 60 at the ink separation point 12*b*.

Further, it is also possible to dispose a known fixing means as by heating or pressing, such as a hot roller, a pressure roller, etc., downstream of the ink transfer position in order to ensure the fixation of a transfer-recorded image formed on the recording medium 3.

In the embodiment shown in FIG. 15, the intermediate transfer roller 60 is used as a transfer-receiving medium, but a recording medium in the form of a film or sheet which can be moved while being in contact with the fluid ink 2, can also be used as a transfer-receiving medium. In this case, the recording medium in a sheet form may preferably have an electroconductive base layer.

Along with the rotation of the intermediate transfer roller 60 in the arrow J direction, the fluid ink 2 contacts the roller 60 at the ink contact point 12*a*. However, the ink is not substantially attached or transferred to the roller 60 as it is substantially non-adhesive under no energy application but is separated from the intermediate transfer roller 60 at the ink separation point to be conveyed in the direction of an arrow N while forming a layer on the roller 87. This movement is enhanced or ensured by smoothening the surface of the roller 60 or by rotating the roller 60 slower than the roller 87.

The fluid ink 2 moving in the above described manner is supplied with an energy pattern corresponding to an image signal from a recording head 65 in the neighborhood of the ink separation point at which the ink contacts the recording head 65, whereby the fluid is selectively imparted with an adhesiveness.

The portion of the fluid ink 2 selectively supplied with an adhesiveness is transferred through adhesion to the intermediate transfer roller 60 rotated in the arrow J direction to form thereon an ink pattern 21 thereon.

Along with the rotation of the intermediate roller 60, the ink pattern 21 is moved from the ink separation position 12*b* to the ink image transfer position at which the recording medium 3 contacts the roller 60, and the ink pattern 21 is transferred at the ink image transfer position to the recording medium 3 to form a transfer-recorded image 22 thereon.

The transfer-recorded image 22 may be further developed as desired with a known visualizing means such as attachment of toner particles disposed along the recording medium 3 downstream of the ink image transfer position.

Figure 16:
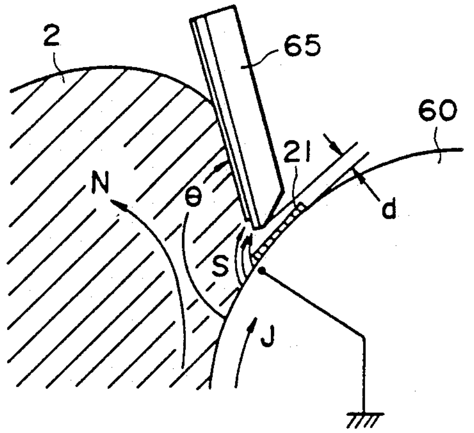
FIG. 16 is an enlarged view of the ink separation point shown in FIG. 15.

The formation of the ink image or picture element 21 at the ink separation point 12*b* is supplemented with reference to FIG. 16 which is an enlarged schematic view around the ink separation point 12 shown in FIG. 15.

Referring to FIG. 16, along with the rotation of the intermediate transfer roller 60 in the arrow J direction, the fluid ink 2 contacting the roller moves in the N direction. The recording head 65 having a structure similar to that shown in FIG. 11 is disposed with a gap d from the intermediate transfer roller 60.

At the ink separation point 12*b* at which the intermediate transfer roller 60 and the recording head face each other in this manner, the above gap d may preferably be about 0.05–3 mm, particularly about 0.05–0.3 mm, so that the fluid ink 2 is well separated from the intermediate transfer roller 60 under no energy application from the recording head 65 to the fluid ink 2.

Further, it is preferred that the recording head 65 is disposed inclined toward the downstream direction of the roller 60 (in the arrow J direction). More specifically, it is preferred that an angle $\theta$ shown in FIG. 16 formed between the tangential line along the transfer roller 60 and the direction of extension of an electrode element 52 (FIG. 11) of the recording head 65 at the ink separation point satisfies the relation of $90° \leqq \theta \leqq 180°$, particularly $105° \leqq \theta \leqq 135°$, from the viewpoint of increasing the selective transfer characteristic of the fluid ink 2 to the intermediate transfer roller 60 at the ink separation point.

When a current is caused to flow as indicated by arrows S in FIG. 16 based on a given image signal through the fluid ink 2 between the electrode 52 (FIG. 11) and the transfer roller 60, a prescribed amount corresponding to the current energy of the ink 2 is selectively provided with an adhesiveness (or a lowered viscosity) to be attached and transferred to the transfer roller 60, thus forming an ink pattern 21 thereon.

In this embodiment, if the gap d is relatively small (e.g., 0.3 mm or less) or the ink 2 is subjected to heat generation by the current conduction, either one of the recording head 65 or the transfer roller 60 may be used as the anode.

On the other hand, when an electrochemical reaction of the fluid ink 2 is used to impart an adhesiveness to the ink, the transfer roller 60 may preferably be disposed on the side where the electrochemical reaction for providing the selective adhesiveness occurs, e.g., the anode side for a gel ink using an anionic crosslinking ion, so that disturbance of the ink pattern 21 may be prevented.

Figure 17:
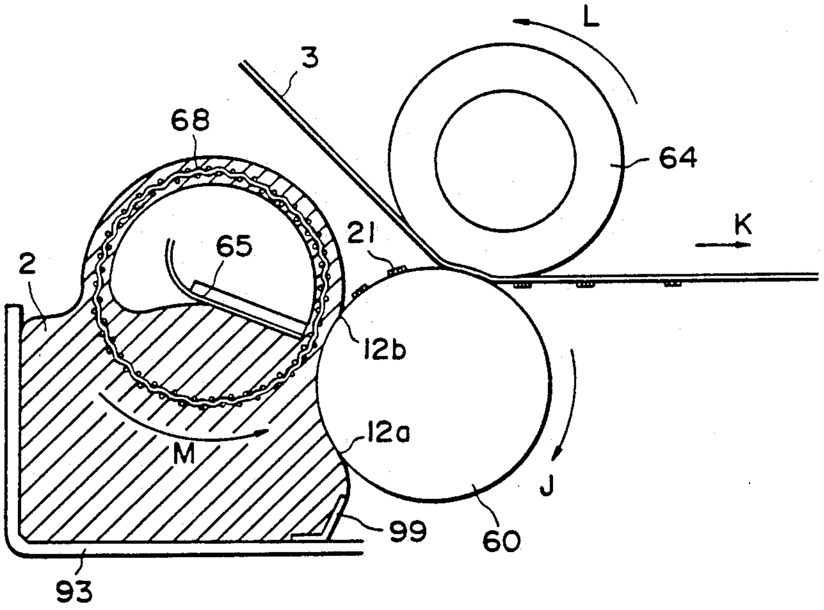

In the present invention, instead of a stirring roller 87 composed of, e.g., a stainless steel cylinder with a roughened surface as used in the apparatus as shown in FIG. 15, there can be used an electrically insulating porous and hollow cylindrical roller 68 as shown in FIG. 17, e.g., one obtained by forming a mesh of plastic such as polyamide into a hollow cylindrical form, in combination with a recording head 65 disposed within the porous hollow roller 68, so that a current is passed from the recording head 65 through the fluid ink 2 impregnating the porous roller 68 to the intermediate transfer roller 60.

The plastic mesh material constituting the porous hollow roller 68 shown in FIG. 17 may preferably have a mesh size of about 10–100 mesh. In this case, the gap d between the recording head 65 and the intermediate transfer roller may preferably be relatively large, e.g., about 1–5 mm, so that the recording apparatus shown in FIG. 17 is adapted to formation of a relatively coarse image. Incidentally, in the apparatus of FIG. 17, a sheet member 99 of a plastic such as polyethylene terephthalate is disposed as desired below the roller 60 so as to prevent the effluence of the fluid ink 2 from the lower part of the ink holding member 93.

The embodiment shown in FIG. 17 is preferred because the stability of separation of the fluid ink at the ink separation point is improved.

Figure 18:
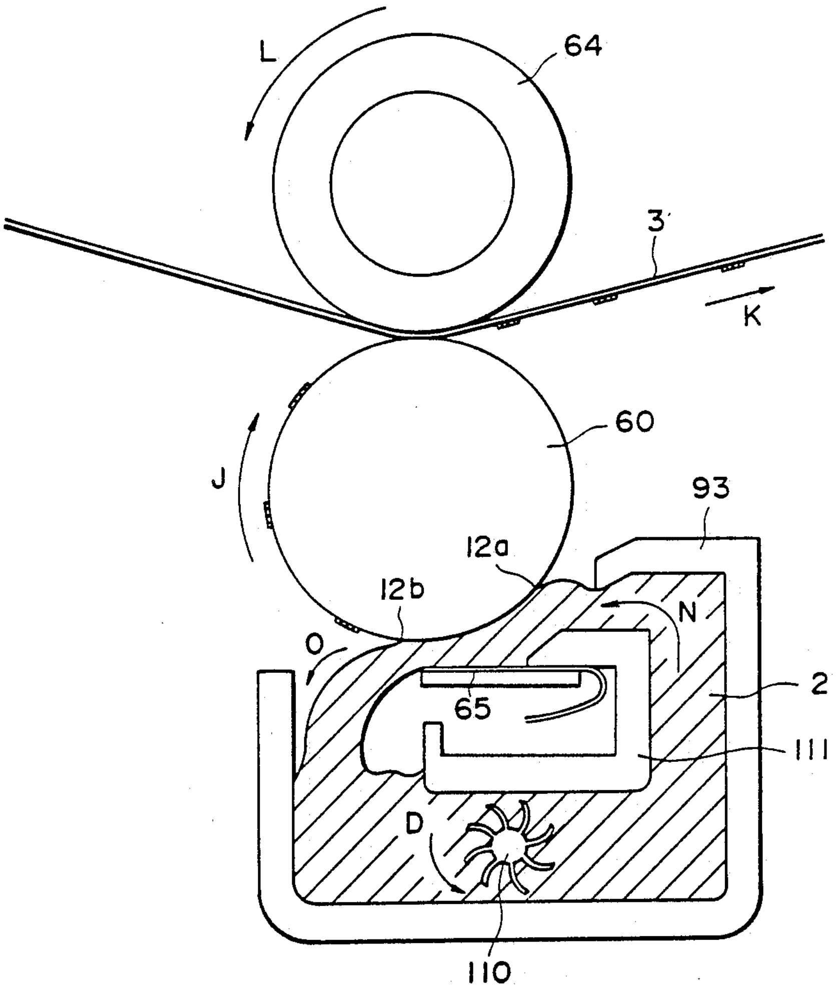

FIG. 18 is a schematic sectional view of another embodiment of the recording system according to the present invention, wherein a fluid ink 2 is caused to flow in the arrow N direction to contact an intermediate transfer roller 60 at an ink content point 12*a* in a somewhat pressurized state by means of a stirring means 110, and the ink layer is caused to separate at an ink separation point 12*b* in the arrow 0 direction by utilization of the gravity.

In the embodiment shown in FIG. 18, a recording head 65 is held in the fluid ink 2 by a recording head-holding member 111 which also functions to regulate the moving direction of the ink 2.

Figure 19:
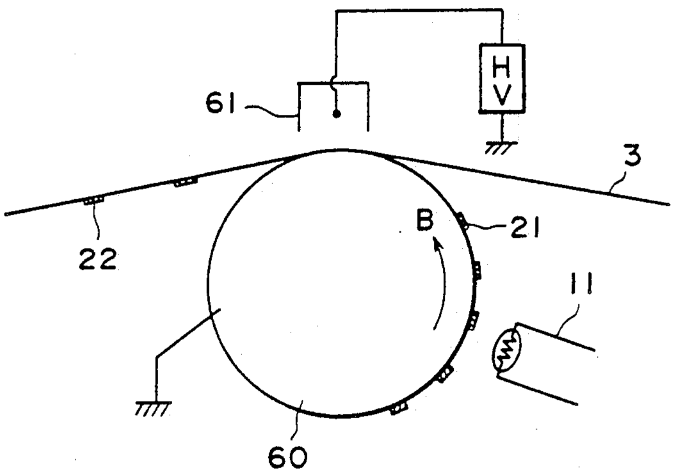
FIG. 19 is a schematic view illustrating another embodiment of transfer means.

Further, as a means for transferring the ink pattern 21 on the intermediate transfer roller 60 onto the recording medium 3, a corona charge transfer device 61 as shown in FIG. 19 can be used instead of a platen roller 64 as a pressure means. In this case, it is preferred to dispose a drying means such as a heater facing the roller 60 upstream of the transfer means 60, so that the content of the liquid dispersion medium such as water in the ink pattern on the transfer roller 60 is decreased in advance.

As described hereinabove, according to the present invention, there are provided an image recording method wherein a specific fluid ink is used and selectively transferred to a transfer-receiving medium through energy application to provide a recorded image at a very low running cost without using a conventional, expensive ink ribbon having a solid ink layer; and also such a specific fluid ink and a recording apparatus suitably used in the method.

More specifically, according to the recording method of the present invention, image recording is easily effected at an extremely low recording cost than the thermal transfer recording method and free from plugging of a nozzle or blurring of recorded images as encountered in the ink jet recording method.

Especially, according to a preferred embodiment of the present invention wherein the crosslinked structure of an ink is changed by passing a current therethrough, image recording can be effected at an amount of current which is about 1/10 of that required in the conventional thermal transfer method using a thermal head, whereby the recording cost can be remarkably reduced also in respect to energy consumption.

Hereinbelow, the present invention will be explained with reference to Examples which however are not intended to restrict the scope of invention in any way. "Part(s)" refers to part(s) by weight. The viscosity values indicated as a property of polyvinyl alcohol compounds were those measured by measuring the viscosity of a 4%-aqueous solution of a sample compound at 20° C. by means of a Hoepler viscometer (according to JIS K-6726-1977) The pH value referred to in the Examples were measured by pH test papers. EXAMPLE 1

| Example 1 | |
|---|---|
| Water | 100 parts |
| Guar gum (Emco Gum (trade name) mfd. by Meyhall, Switzerland) | 1 part |
| Sodium borate ($Na_2B_4O_7 \cdot 10H_2O$) | 0.05 part |

The above ingredients were uniformly mixed under heating at 90° C. and then leftstanding at room temperature to form a gel ink retaining a high percentage of water and having an indefinite shape, i.e., a fluidity. The pH of the ink was adjusted to 8 by using a 1N—NaOH solution.

Figure 6B:
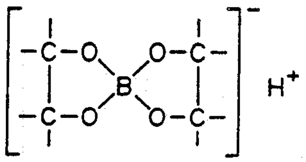

In the gel ink, it was assumed that the cis-OH groups at C3 and C4 in the mannose chain and/or the cis-OH groups in the galactose brach of the guar gum (FIG. 6A) were crosslinked by the borate ions (FIG. 6B).

The pH of the gel ink was lowered to below 7 by the addition of hydrochloric acid to be once converted into a viscous sol, into which 50 parts of toner particles of 10 μm size (cyan toner, before addition of externally added fluidity improver, for NP color copier, mfd. by Canon K.K.) were added and uniformly mixed. Then, the mixture was again brought, to a pH 8 by the addition of 1N—NaOH to obtain a gel ink in the form of sludge.

The sludge ink was charged in an apparatus as shown in FIG. 5 wherein an ink-carrying roller 81 comprising a cylindrical roller of 20 mm in diameter having a surface of stainless steel with a surface roughness of 1S and an intermediate transfer roller 60 comprising an iron cylindrical roller of 20 mm in diameter having a surface coated with a hard chromium plating were disposed opposite to each other with a gap of 2 mm at the transfer position The sludge ink 2 obtained above was charged in the ink container 63.

The ink-carrying roller 81 was rotated in the arrow R direction at about 80 rpm to form thereon a layer of the ink 2, and in contact with the ink layer 2, the intermediate transfer roller 60 was rotated in the arrow H direction at about 50 rpm. In this instance, when electric energy was not supplied from a recording head 65 to the ink layer 2 a very slight amount of water was transferred to the transfer roller 60, but the ink 2 was not substantially transferred to the transfer roller 60. The recording head 65 had a structure as shown in FIG. 11, wherein each electrode element 52 of copper was coated with a polyimide insulating film 53 except for a tip thereof which was coated with Au plating in an area of 100 μm×100 μm.

On the other hand, when a pulse of 400 V and 500 μsec (FIG. 13B) was applied through the ink layer 2 between the recording head 65 as the anode and the ink-carrying roller 81 as the cathode to pass a current of about 2.5 mA per each electrode element 52, the ink 2 was selectively transferred to the transfer roller 60 to form an ink pattern 21 thereon.

At the ink image transfer position, a platen roller 64*a* of a 12 mm-dia. iron cylindrical roller surfaced with 4 mm-thick silicone rubber layer was disposed opposite to the intermediate transfer roller 60 with a recording medium of plain paper disposed therebetween moving in the arrow G direction. Further the platen roller 64*a* was rotated in the arrow F direction at the same speed as the transfer roller 60 while exerting a slight pressure onto the recording medium 3. As a result, cyan colored dot images each of about 100×150 μm in size were formed on the recording medium 3. A photomechanical reproduction of the dot images with remarks is shown as FIG. 13A.

The cyan-colored dot images were fixed onto the recording medium by means of a hot roller fixer (not shown) disposed downstream from the ink image transfer position and heated to 180° C., whereby well-fixed images were obtained. A slight amount of the ink remaining on the intermediate transfer roller 60 downstream of the ink image transfer position was removed by means of a cleaner 9 having a blade 9*a* of urethane rubber.

According to our knowledge, it is presumed that the above image formation was effected because electrons were deprived of the borate ions ($BO_4^-$, FIG. 6B) crosslinking the guar gum due to an anodic reaction to destroy at least a part of the crosslinked structure, whereby the ink was imparted with an adhesiveness selectively or imagewise. The reaction at this time may presumably be expressed by the following formula:

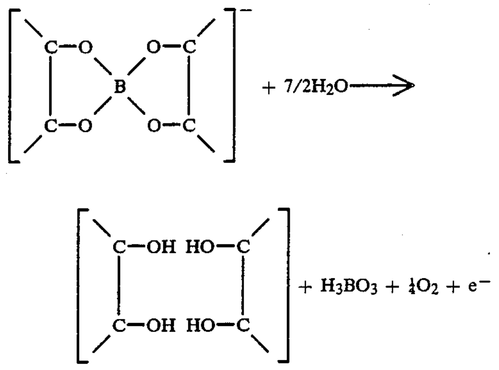

Further, in this Example wherein only a very slight part of the ink 2 was subjected to breakage of the crosslinked structure, the restoration of the gel structure was observed in several seconds to several tens of seconds.

We believe that the restoration of the gel structure is presumably caused by diffusion of ions, but the period of the several seconds to several tens of seconds is long enough to transfer a portion of the ink which has been imparted with an adhesiveness based on signal application to the intermediate transfer roller 60 and is short enough to reuse the non-transferred remaining portion for further operation.

EXAMPLE 2

| Example 2 | |
|---|---|
| Water | 100 parts |
| Locust bean gum | 0.5 part |

-continued

| Example 2 | |
|---|---|
| (available from Nikko Fine Products K.K.) | |
| Xanthane gum | 0.5 part |
| (trade name: Rhodapol 23, mfd. by Rhonepoulene) | |

The above ingredients were uniformly mixed under heating above 60° C. to form a viscous solution, which has then cooled by leaving it at room temperature to obtain a gel ink according to the present invention. The gel ink was reversibly converted into a sol by heating it to above about 40° C.

In the course of the natural cooling in the range of 60° C.–40° C. not providing a complete gel, 50 parts of the same toner particles as used in Example 1 were uniformly mixed to obtain a gel sludge ink.

The sludge ink was applied to the same image forming operation as in Example 1 except that the energy application was replaced by an ordinary thermal head while applying a pulse of 24 V and 30 mA to each pixel. As a result, similar images as obtained in Example 1 were obtained. However, some irregularities in image were observed. The irregularities were caused presumably because an ordinary thermal head used herein had a gap of about 3 mm between the substrate edge thereof and the heat generating member, so that it took some time after the ink was supplied with the energy until the ink reached the intermediate transfer roller 60.

EXAMPLE 3

About 100 parts of the gel ink prepared in the same manner as in Example 1 by using the same ingredients was brought to a pH of below 7 by adding an acid to be once converted into a viscous sol, into which 50 parts of black toner particles of 10 μm in size (black toner) before addition of externally added fluidity improver, for PC-10/20 copier, mfd. by Canon K.K.) were uniformly mixed. The pH of the mixture was again increased to 8 to form a gel ink in the form of a sludge.

The sludge ink was charged in an apparatus as shown in FIG. 5 wherein an ink-carrying roller 81 comprising a cylindrical roller of 20 mm in diameter having a surface of stainless steel with a roughness $R_Z$ of 100 μm provided by sandblasting or flame spraying and an intermediate transfer roller 60 comprising an iron cylindrical roller of 20 mm in diameter coated with a hard chromium plating were disposed opposite to each other with a gap of 2 mm at the transfer position. The sludge ink 2 obtained above was charged in the ink container 63.

The ink carrying roller 81 was rotated in the arrow R direction at about 36 rpm to form a layer of the ink 2 thereon, and in contact with the ink layer 2, the transfer roller 60 was rotated in the arrow H direction at about 30 rpm. In this instance, when electric energy was not supplied from a recording head 65 to the ink layer 2, a very slight amount of water was transferred to the transfer roller 60, but the ink 2 was not substantially transferred to the transfer roller 60. The recording head 65 had a structure as shown in FIG. 11, wherein each electrode element 52 of copper was coated with a polyimide insulating film 53 except for a tip portion thereof which was coated with an Au plating in an area of 500×500 μm so as to provide a pixel density of 1 pixel/mm.

Figure 22A:
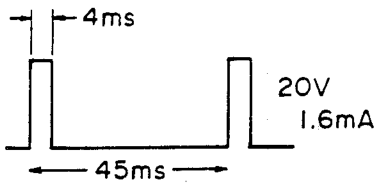
FIGS. 22A–22C are time charts showing examples of pulse signals used in Example 3.
Figure 22B:
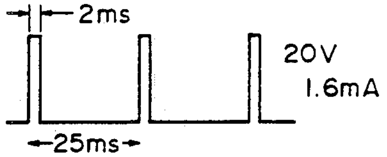
Figure 22C:
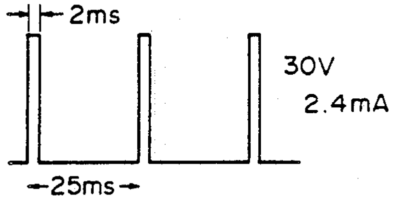

On the other hand, when pulse voltages as shown in FIG. 22A–22C were applied through the ink layer 2 between the recording head 65 as the anode and the ink-carrying roller 81 as the cathode to pass a current of about 1.6–2.4 mA per each electrode element 52, the ink 2 was selectively transferred to the transfer roller 60 to form an ink pattern 21 thereon.

Figure 23A:
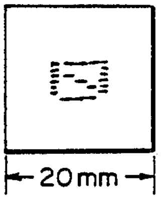
FIGS. 23A–23C show photomechanical reproductions of image samples obtained in Example 3.
Figure 23B:
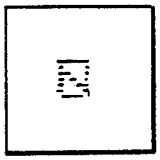
Figure 23C:
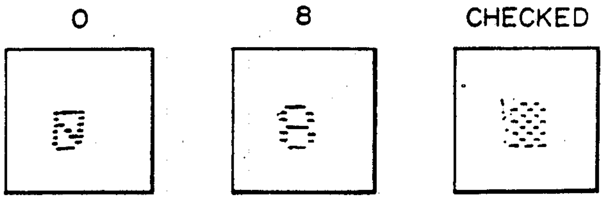

At the ink image transfer position, a platen roller **64*a* of a 12 mm-dia. iron cylindrical roller surface with 4 mm-thick silicone rubber was disposed opposite to the intermediate transfer roller 60 with a recording medium 3 of plain paper disposed therebetween moving in the arrow G direction. Further, the platen roller 64*a* was rotated in the arrow F direction at the same speed as the transfer roller 60 while applying a slight pressure onto the recording medium 3. As a result, black colored images were formed on the recording medium 3. FIGS. 23A–23C show a photomechanical reproduction (about 1.2 times) of the images thus obtained. The images shown in FIG. 23A–23C were obtained by applying the pulses shown in FIGS. 22A–22C**, respectively, for providing successive dot image portions.

The images were fixed onto the recording medium 3 by means of a hot roller fixer (not shown) disposed downstream from the ink image transfer position and heated to 180° C., whereby sufficiently fixed images were obtained. A slight amount of the ink remaining on the intermediate transfer roller 60 downstream of the ink image transfer position was removed by means of a cleaner 9 having a blade **9*a*** of urethane rubber.

The above operation was repeated by the recording head 65 by an ordinary thermal head so as to selectively lower the viscosity of the fluid ink 2, whereby a similar image was obtained.

Incidentally, in case where the above described image recording operation was conducted by using an ink-carrying roller 81 having a surface roughness $R_Z$ of less than 1 μm, a phenomenon of the ink layer being transferred as a whole to the intermediate transfer roller 60 could be observed occasionally at the time of start-up of the apparatus.

On the other hand, when the ink-carrying roller 81 was provided with a surface roughness $R_Z$ of over 1 mm, a comparatively long time was required before a smooth layer of the ink 2 was formed on the ink-carrying roller 81.

On the other hand, when an ink-carrying roller 81 having a surface roughness $R_Z$ in the range of 1 μm–1 mm, e.g., $R_Z$ = 100 μm as in this example, was used, no problem of non-selective transfer of the ink at start-up or delay in formation of a uniform ink layer was encountered.

EXAMPLE 4

The image recording operation in Example 3 was repreated by replacing the ink-carrying roller 81 with a hollow cylindrical roller 81 having inside thereof a magnet roller 98, as shown in FIG. 20, whereby similar results were obtained.

The magnet roller 98 comprised a sintered magnet of barium ferrite—strontium ferrite, and provided a surface magnetic flux of 800 Gauss as measured on the surface of the ink-carrying roller 81 at the ink transfer position facing the intermediate transfer roller 60.

The fluid ink 2 used was the same ink as used in Example 3, in which the toner particles used contained about 50 parts of magnetic per 100 parts of the resin. As a result, a constraint force is exerted on the ink layer by the magnetic field, so that the non-selective transfer of the ink layer onto the intermediate transfer roller 60 was never caused at the start-up of the apparatus. In this case, it was desirable that the intermediate transfer roller 60 was composed of a non-magnetic material such as stainless steel.

EXAMPLE 5

The image recording operation in Example 3 was repeated except that a stainless steel roller having a surface roughness $R_Z$ of 0.1 μm was used as the ink-carrying roller 81, and a stainless steel roller of 20 mm in diameter coated with an about 10 μm-thick silicone varnish layer.

In this instance, a 0.05%-aqueous solution of sodium borate as an ink vehicle showed a contact angle of below 10° on the ink-carrying roller and a contact angle of about 100° on the intermediate tranfer roller 3a.

As a result of the above operation, substantially the same results as in Example 3 were obtained.

EXAMPLE 6

| Example 6 | |
|---|---|
| Polyvinyl alcohol (Gohsenol GM-14, mfd. by Nihon Gosei Kagaku K.K.; viscosity: 22 cps, saponification degree: 88 mol %) | 3 g |
| Water | 30 g |
| Water-soluble phthalocyanine pigment (Water Blue 3, mfd. by Orient Kagaku K.K.) | 1.2 g |

The above ingredients were uniformly mixed under heating at 90° C. to form a solution, into which 10 drops of 0.1 N—NaOH was added dropwise and then 50 drops of 10 wt. %-aqueous solution of sodium tetraborate were added dropwise under stirring, whereby a gel ink having a fluidity was obtained.

The thus obtained gel ink was applied to the same recording apparatus as used in Example 1 and having a structure as shown in FIG. 5 to effect an image formation test.

The gel ink was charged in the ink container 63 of the apparatus, and the ink carrying roller 81 was rotated at about 60 rpm, whereby the gel ink was suitably applied onto the ink-carrying roller 81 to form thereon a layer of the fluid ink 2. The thus formed ink layer had a very smooth surface, and the thickness thereof could be arbitrarily controlled.

In contact with the ink layer 2 formed on the ink-carrying roller 81, the intermediate transfer roller 60 was rotated in the arrow H direction at about 50 rpm. In this instance, when electric energy was not supplied from a recording head 65 having an electrode or pixel density of 8 pixels/mm to the ink layer 2, the ink was not substantially transferred to the transfer roller.

On the other hand, when a pulse of 10 V and 500 μsec was applied through the ink layer 2 between the recording head 65 as the anode and the ink carrying roller 81 as the cathode, the ink 2 was selectively transferred to the transfer roller 60 to form an ink pattern thereon.

At the ink image transfer position, a platen roller 64a of a 12 mm-dia. iron cylindrical roller surfaced with 4 mm-thick silicone rubber was disposed opposite to the intermediate transfer roller 60 with a recording medium 3 of plain paper disposed therebetween moving in the arrow G direction. Further, the platen roller 64a was rotated in the arrow F direction at the same speed as the transfer roller 60 while applying a slight pressure onto the recording medium 3. As a result, blue colored dot images 22 corresponding to the ink pattern 21 were formed on the recording medium 3 at a good transfer rate from the intermediate transfer roller 60.

The thus transfer-recorded image 22 formed on the recording medium 3 was free from tailing, fogging, scratchiness and blurring, and provided a printed letter of high quality having a sufficiently high image density.

EXAMPLES 7-14, 17-19

Inks were prepared and evaluated through image formation in the same manner as in Example 6 except that the polyvinyl alcohol (Gohsenol GM-14, viscosity: 22 cps, saponification degree: 88 mol %) used in Example 6 was respectively replaced by the following series of commerically available polyvinyl alcohols (available from Nihon Gosei Kagaku K.K.) indicated with their trade viscosity and saponification degree:

| Example | Trade name | Viscosity | Saponification degree |
|---|---|---|---|
| 7 | Gohsenol NH-26 | 65 cps | 99.5 mol % |
| 8 | Gohsenol NL-05 | 50 | 99 |
| 9 | Gohsenol AH-22 | 52 | 98 |
| 10 | Gohsenol C-500 | 25 | 96 |
| 11 | Gohsenol GH-23 | 50 | 88 |
| 12 | Gohsenol GL-03 | 3 | 88 |
| 13 | Gohsenol KH-20 | 46 | 80.5 |
| 14 | Gohsenol KP-06 | 6 | 72 |
| 17 | OKS 9818N | 1.6 | 98.5 |
| 18 | OKS 9018G | 1.7 | 87 |
| 19 | OKS 9018K | 1.6 | 79.5 |

In all of these Examples, similarly good results as in Example 6 were obtained.

EXAMPLE 15

An ink was prepared and evaluated in the same manner as in Example 6 except that 38 of the polyvinyl alcohol (Gohsenol GM-14) was replaced by 1 g of the Gohsenol GM-14 and the amount of the 10%-aqueous solution of sodium tetraborate was decreased to 40 drops. As a result, similarly good results as in Example 6 were obtained.

EXAMPLE 16

An ink was prepared and evaluated in the same manner as in Example 6 except that 38 of the polyvinyl alcohol (Gohsenol GM-14) was replaced by 40 g of the Gohsenol GM-14 and the amount of the 10%-aqueous solution of sodium tetraborate was increased to 60 drops. As a result, similarly good results as in Example 6 were obtained.

EXAMPLE 20

An ink was prepared and evaluated in the same manner as in Example 6 except that a mixture of 3 g of ethylene glycol and 27 g of water was used instead of 30 g of water used in Example 6 were obtained.

EXAMPLE 21

An ink was prepared and evaluated in the same manner as in Example 6 except that a mixture of 9 g of ethylene glycol and 21 g of water was used instead of 30 g of water used in Example 6, whereby similarly good results as in Example 6 were obtained.

EXAMPLE 22

An ink was prepared and evaluated in the same manner as in Example 6 except that a mixture of 9 g of diethylene glycol and 21 g of water was used instead of 30 g of water used in Example 6, whereby similarly good results as in Example 6 were obtained.

EXAMPLE 23

An image formation test was conducted by using the ink prepared in Example 6 in the same manner as in Example 6 except that the recording head 65 was replaced by a thermal head array of 8 pixels per mm for thermal transfer printing. Thus, a heat pulse was generated from the thermal head and applied to the ink 2 to selectively convert the ink into a sol susceptible of transfer, whereby a similar transfer-recorded image was obtained, but the image was somewhat disordered because of the gap between the substrate edge and the heat generating member of the thermal head as in Example 2.

COMPARATIVE EXAMPLE 1

An ink was prepared and evaluated in the same manner as in Example 6 except that the polyvinylalcohol (Gohsenol GM-14) was replaced by a high molecular-weight polyvinyl alcohol (obtained from Kishida Kagaku K.K.; viscosity: 85 cps, saponification degree: 90 mol %), whereby the resultant gel ink failed to show a sufficient fluidity and could not be formed into a layer on the ink-carrying roller 81.

COMPARATIVE EXAMPLE 2

An ink was prepared and evaluated in the same manner as in Example 6 using the same apparatus except that the polyvinylalcohol (Gohsenol GM-14) was replaced by a low saponification degree polyvinyl alcohol (obtained from Kishida Kagaku K.K.; viscosity: 12 cps, saponification degree: 60.5 mol %). The resultant gel ink showed a poor adhesiveness so that it would not be readily attached to the ink-carrying roller. Further, the ink showed a poor sensitivity when supplied with a signal and provided poor printed letter images with scratchiness and trailing which were far from being practically acceptable.

EXAMPLE 24

A gel sludge ink was prepared in the same manner from the same ingredients as in Example 1. The viscosity of the gel sludge ink was measured by a rotational viscometer (Vismetron Model VS-A1, mfd. by Shibaura System K.K.), and formed to be about 200,000 cps at a rotor speed of 0.3 rpm and about 100,000 cps at a rotor speed of 1.5 rpm.

The sludge ink was evaluated by using an apparatus as shown in FIG. 15, wherein an intermediate transfer roller 60 comprising a 20 mm-dia. smooth cylindrical roller of iron coated with rhodium plating and a stirring roller 87 comprising a 20 mm-dia. stainless steel cylindrical roller having a surface sand-blasted to have a roughness of 10S were disposed opposite to each other at the ink separation; position with a gap of 8 mm therebetween, and a recording head 65 was disposed opposite to the transfer roller 60 at the ink separation position so as to provide d=0.5 mm and $\theta=150°$ (FIG. 16). The sludge ink 2 obtained above was charged in the ink container 93 of the apparatus.

The intermediate transfer roller 60 was rotated in the arrow J direction at about 30 rpm, while the stirring roller 87 was rotated in the arrow M direction at about 35 rpm. In this instance, when electric energy was not applied from a recording head 65 to the fluid ink 2, a very slight amount of water was transferred to the transfer roller 60, but the ink 2 was not substantially transferred to the transfer roller 60. The recording head 65 had a structure as shown in FIG. 11, wherein each electrode element 52 of copper was coated with a polyimide insulating film 52 except for a tip thereof which was coated with Au plating in an area of 100 μm×100 μm.

In this instance, it was observed preferable that the peripheral speed of the stirring roller 87 was equal to or somewhat larger than, e.g., 1.1–2 times, that of the intermediate transfer roller 60, so that the flow of the fluid ink 2 in the arrow N direction was stabilized.

On the other hand, when a pulse of 15 V and 2 msec was applied through the ink 2 between the recording head 65 as the cathode and the intermediate transfer roller 60 as the anode, a current of about 1 mA was flown per electrode element 52 and the ink 2 was selectively transferred onto the intermediate transfer roller 60 to form an ink pattern 21 of 300 μm×150 μm thereon.

When the distance d between the recording head 65 and the roller 60 (FIG. 16) was enlarged, a similar ink pattern 21 was formed by increasing the voltage applied to the recording head 65. However, there was observed a tendency that the size of the ink pattern 21 was also enlarged as the voltage increases. It is considered that this is because a larger d results in a broader current path indicated by an arrow S.

In case where a change in adhesiveness because of a change in crosslinked structure through an electrochemical reaction of an ink was utilized as was in this Example, the conversion into sol of the ink was caused only in the vicinity of the surface of the roller 60, so that "trailing" of image caused by provision of an adhesiveness to a part other than the necessary part of the ink was not observed.

When the anode is composed of a metal of a large ionization tendency, the metal is liable to be dissolved in the ink 2, so that the surface of the roller 1 is particularly preferably protected by a metal with a small ionization tendency such as gold, rhodium or platinum as was in this case.

At the ink image transfer position, a platen roller 64 of a 12 mm-dia. iron cylindrical roller surfaced with 4 mm-thick silicone rubber layer was disposed opposite to the intermediate transfer roller 60 with a recording medium 3 of plain paper disposed therebetween moving in the arrow K direction. Further, the platen roller 64 was rotated in the arrow L direction at the same speed as the intermediate transfer roller 60 while applying a slight pressure onto the recording medium 3. As a result, cyan colored dot images corresponding to the above-mentioned ink pattern 21 were formed on the recording medium 3.

The cyan-colored dot images were fixed onto the recording medium 3 by means of a hot roller fixer (not shown) disposed downstream from the ink image transfer position, whereby sufficiently fixed images were obtained.

EXAMPLE 25

An image forming operation as in Example 24 was conducted by using the same sludge fluid ink 2 but by using an apparatus as shown in FIG. 17 wherein the stirring roller 87 was replaced by a porous hollow cylindrical roller 68 of 50 mesh polyamide in which the same recording head 65 was disposed with a spacing of 3 mm from the transfer roller 60. From the recording head 65, the same energy application as in Example 24 was effected. As a result, images similar to but somewhat coarser than those obtained in Example 24 were formed on the recording medium 3.

In this instance, the separation of the fluid ink 2 and the intermediate transfer roller 60 at the ink separation position could be effected more stably than in Example 24.

What is claimed is:

1. A recording apparatus, comprising:

an ink holding means having an ink-supply part and holding a fluid ink so that the fluid ink will contact a transfer-receiving medium moved along the ink-supply part at the ink supply part, wherein said fluid ink is substantially non-adhesive but can be imparted with an adhesiveness by electro-chemical reaction, and an energy application means for applying a pattern of energy corresponding to a given image signal to the fluid ink at or in the neighborhood of the ink supply part to provide the fluid ink with an adhesive pattern, wherein said energy application means causes said electro-chemical reaction;

whereby at the ink-supply part, the adhesive pattern of the fluid ink is transferred to the transfer-receiving medium to form thereon an ink pattern corresponding to the energy pattern applied.

2. An apparatus according to claim 1, wherein at the ink supply part, the fluid ink first contacts the transfer-receiving medium and supplied with the pattern of energy.

3. An apparatus according to claim 1, wherein said ink supply part has a length extending from an initial ink contact point to an ink separation point, and at the ink separation point, the fluid ink is supplied with the pattern of the energy to be selectively provided with the adhesive pattern to be transferred to the transfer-receiving medium.

4. An apparatus according to claim 1, which further comprises a fixing means disposed along the transfer-receiving medium at a point downstream from the ink supply part.

5. An apparatus according to claim 1, wherein said transfer-receiving medium constitutes an intermediate transfer medium, and the ink pattern formed thereon is further transferred to a recording medium.

6. An apparatus according to claim 1, wherein said ink-holding member is in the form of a container and is provided with a stirring means disposed thereon.

7. An image recording apparatus, comprising:

an ink-carrying member moved along an ink contact position for carrying thereon a layer of a fluid ink, the fluid ink being substantially non-adhesive but capable of being imparted with an adhesive by electro-chemical reaction;

a transfer-receiving medium moved along the ink contact position so as to contact the fluid ink layer formed on the ink-carrying member at the ink contact position; and an energy application means for applying an energy to the fluid ink layer, wherein the energy application means causes the electro-chemical reaction in the fluid ink;

whereby a part of the fluid ink on the ink-carrying member imparted with an adhesiveness on application of the energy is selectively transferred to the transfer-receiving medium.

8. An apparatus according to claim 7, which further comprises a transfer means disposed opposite to the ink-carrying member with the transfer-receiving medium disposed therebetween.

9. An apparatus according to claim 7, wherein said energy application means comprises a recording electrode, from which a current is passed through the fluid ink to the ink-carrying member.

10. An apparatus according to claim 7, wherein said energy application means comprises a recording electrode, from which a current is passed through the fluid ink to the transfer-receiving medium.

11. An apparatus according to claim 7, wherein said transfer-receiving medium constitutes an intermediate transfer medium so that the ink pattern formed thereon is further transferred to a recording medium disposed opposite to the intermediate transfer medium at an ink image transfer position downstream from the ink contact position.

12. An apparatus according to claim 11, wherein said ink-carrying member and said intermediate transfer medium are respectively in the form of a cylinder.

13. An apparatus according to claim 11, which further comprises a transfer means disposed opposite to the intermediate transfer medium by the medium of the recording medium at the ink image transfer position.

14. An apparatus according to claim 11, which further comprises a charging transfer means disposed opposite to the intermediate transfer medium by the medium of the recording medium at the ink image transfer position.

15. An apparatus according to claim 11, which further comprises a fixing means for fixing the ink pattern transferred to the recording medium onto the recording medium at a position downstream from the ink image transfer position.

16. An apparatus according to claim 11, which further comprises a means for regulating the thickness of the fluid ink layer on the ink-carrying member disposed with a gap from the ink-carrying member at a position upstream of the energy application means.

17. An apparatus according to claim 11, which further comprises a cleaning means at a position downstream from the ink image transfer position along the intermediate transfer medium.

18. An apparatus according to claim 11, wherein said ink carrying member exerts a fluid ink-conveying force which is larger than that of the intermediate transfer medium.

19. An apparatus according to claim 18, wherein said ink-carrying member has a surface which is rougher than that of the intermediate transfer medium.

20. An apparatus according to claim 19, wherein said ink carrying member has roughness $R_Z$, i.e., 10 point-average surface roughness along the peripheral direction (according to JIS B0601-1982), of 1–1000 $\mu$m, and said intermediate transfer medium has a roughness $R_Z$ of 1 $\mu$m or less.

21. An apparatus according to claim 20, wherein said ink-carrying member has a roughness $R_Z$ of 10–500 $\mu$m.

22. An apparatus according to claim 20, wherein said intermediate transfer medium has a roughness $R_Z$ of 1 $\mu$m or less.

23. An apparatus according to claim 18, wherein said ink-carrying member is in the form of a cylinder, inside of which a magnetic field generation means is disposed.

24. An apparatus according to claim 23, wherein said magnetic-field generation means generates a field of 200–2000 Gauss as measured on the surface of the ink-carrying, member at the ink contact position.

25. An apparatus according to claim 18, wherein said intermediate transfer medium has a surface providing a surface energy which is lower than that of the surface of the ink-carrying member.

26. An apparatus according to claim 25, wherein the surface of the ink-carrying member provides a contact angle $\theta_1$ with a water droplet and the surface of the intermediate transfer medium provides a contact angle $\theta_4$ with a water droplet, the $\theta_1$ and $\theta_4$ satisfying the relation of: $\theta_4-\theta_1 \geqq 10°$.

27. An apparatus according to claim 11, wherein said energy application means comprises a recording electrode, from which a current is passed through the fluid ink to the intermediate transfer medium.

28. A recording apparatus, comprising:

an ink-holding means having an ink supply part and holding a fluid ink so as to supply the fluid ink from the ink supply part, wherein said fluid ink is substantially non-adhesive but can be imparted with an adhesiveness by electro-chemical reaction, and an insulating endless moving member moved also along the ink supply part so as to regulate the movement of the fluid ink at the ink supply part; and an energy application means for applying a pattern of energy corresponding to a given image signal to the fluid ink at or in the neighborhood of the ink supply part to provide the fluid ink with an adhesive pattern, wherein said energy application means causes said electro-chemical reaction;

whereby at the ink supply part, the adhesive pattern of the fluid ink is selectively transferred to the intermediate transfer medium to form thereon an ink pattern corresponding to the energy pattern applied, the ink pattern formed on the intermediate transfer medium being thereafter transferred to a recording medium.

* * * * *

UNITED STATES PATENT AND TRADEMARK OFFICE

CERTIFICATE OF CORRECTION

PATENT NO. : 4,962,389 Page 1 of 7

DATED : October 9, 1990

INVENTOR(S) : Fumitaka Kan et al.

It is certified that error appears in the above-identified patent and that said Letters Patent is hereby corrected as shown below:

COLUMN 1:

Line 37, "non-use" should read --non-use.--;

Line 56, "unnecessitate" should read --makes unnecessary--.

COLUMN 2:

Line 18, "medium" should read --medium.--;

Line 29, "results" should read --result--.

COLUMN 4:

Line 31, "FIGS. 13A" should read --FIG. 13A--.

COLUMN 5:

Line 38, "ot" should read --or--.

UNITED STATES PATENT AND TRADEMARK OFFICE
CERTIFICATE OF CORRECTION

PATENT NO. : 4,962,389 Page 2 of 7

DATED : October 9, 1990

INVENTOR(S) : Fumitaka Kan et al.

It is certified that error appears in the above-identified patent and that said Letters Patent is hereby corrected as shown below:

COLUMN 9:

Line 35, "thereon" (first occurrence) should be deleted.

COLUMN 11:

Line 26, "is" should read --in--.

Line 37, "borad" should read --broad--.

COLUMN 12:

Line 14, "carrageenah," should read "carrageenan,--.

Line 66, "an" should read --a--.

COLUMN 13:

Line 36, "alcohol (or" should read --alcohol" or--.

UNITED STATES PATENT AND TRADEMARK OFFICE

CERTIFICATE OF CORRECTION

PATENT NO. : 4,962,389 Page 3 of 7

DATED : October 9, 1990

INVENTOR(S) : Fumitaka Kan et al.

It is certified that error appears in the above-identified patent and that said Letters Patent is hereby corrected as shown below:

Line 50,

" 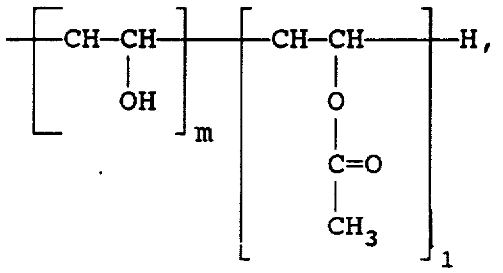 "

should read

-- 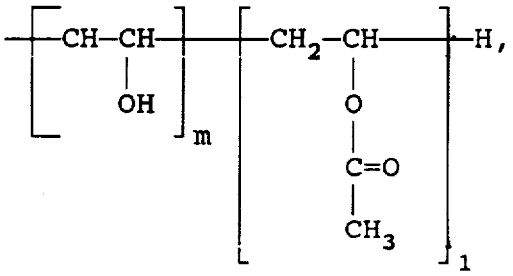 --

UNITED STATES PATENT AND TRADEMARK OFFICE

CERTIFICATE OF CORRECTION

PATENT NO. : 4,962,389 Page 4 of 7

DATED : October 9, 1990

INVENTOR(S) : Fumitaka Kan et al.

It is certified that error appears in the above-identified patent and that said Letters Patent is hereby corrected as shown below:

COLUMN 14:

Line 5, "filed" should read --field--.

Line 36, "In" should read --If--.

COLUMN 15:

Line 19, "guan gum" should read --guar gum--.

Line 42, "material" should read --materials--.

COLUMN 16:

Line 45, "fluidity" should read --fluidity and is--.

COLUMN 17:

Line 43, "energy" should read --energy.--.

COLUMN 18:

Line 6, "defines" should read --define--.

UNITED STATES PATENT AND TRADEMARK OFFICE

CERTIFICATE OF CORRECTION

PATENT NO. : 4,962,389

DATED : October 9, 1990

INVENTOR(S) : Fumitaka Kan et al.

It is certified that error appears in the above-identified patent and that said Letters Patent is hereby corrected as shown below:

COLUMN 20:

Line 57, "become" should read --becomes--; and "remove, a" should read --remove a--.

COLUMN 21:

Line 1, "torque gage" should read --torque gauge--.

Line 25, "Rougnening" should read --Roughening--.

COLUMN 22:

Line 18, "a" (first occurrence) should read --an--.

Line 54, "various" should read --varies--.

COLUMN 24:

Line 21, "disposed" should read --is disposed--.

Line 30, "face" should read --to face--.

UNITED STATES PATENT AND TRADEMARK OFFICE

CERTIFICATE OF CORRECTION

PATENT NO. : 4,962,389 Page 6 of 7

DATED : October 9, 1990

INVENTOR(S) : Fumitaka Kan et al.

It is certified that error appears in the above-identified patent and that said Letters Patent is hereby corrected as shown below:

COLUMN 25:

Line 6, "thereon" (first occurrence) should be deleted.

COLUMN 27:

Line 13, "pH value" should read --pH values--.

Line 14, "EXAMPLE 1" should read (as a centered heading) --EXAMPLE 1--.

Line 30, "galactose brach" should read --galactose branch--.

Line 38, "brought," should read --brought--.

Line 48, "position" should read --position.--

COLUMN 29:

Line 5, "Rhonepoulene" should read --Rhone-Poulenc--.

Line 9, "has" should read --was--.

UNITED STATES PATENT AND TRADEMARK OFFICE

CERTIFICATE OF CORRECTION

PATENT NO. : 4,962,389 Page 7 of 7

DATED : October 9, 1990

INVENTOR(S) : Fumitaka Kan et al.

It is certified that error appears in the above-identified patent and that said Letters Patent is hereby corrected as shown below:

COLUMN 31:

Line 32, "was" should read --were--.

COLUMN 32:

Line 36, "38" should read --3g--.

Line 46, "38" should read --3g--.

COLUMN 33:

Line 20, "polyvinylalcohol" should read --polyvinyl alcohol--.

Line 31, "polyvinylalcohol" should read --polyvinyl alcohol--.

Line 57, "separation; position" should read --separation position--.

Signed and Sealed this

Thirtieth Day of June, 1992

*Attest:*

DOUGLAS B. COMER

*Attesting Officer* *Acting Commissioner of Patents and Trademarks*